US007523385B2

(12) United States Patent
Nguyen et al.

(10) Patent No.: US 7,523,385 B2
(45) Date of Patent: Apr. 21, 2009

(54) SYSTEM AND METHOD FOR ENTERPRISE EVENT MARKETING AND MANAGEMENT AUTOMATION

(75) Inventors: Justin T. Nguyen, Santa Clara, CA (US); John Chang, Santa Clara, CA (US); Stanley Chin, Palo Alto, CA (US); Charles Yang, San Jose, CA (US); William R. Peltz, Palo Alto, CA (US); Helen Loh, San Mateo, CA (US); Raymond Thackery, Ashtead (GB); Annie Bei Han, San Francisco, CA (US); Betty Ku Kang, San Jose, CA (US); Glen Yan-Kit Kuo, Los Altos, CA (US)

(73) Assignee: Starcite, Inc., Philadelphia, PA (US)

( * ) Notice: Subject to any disclaimer, the term of this patent is extended or adjusted under 35 U.S.C. 154(b) by 1502 days.

(21) Appl. No.: 10/007,315

(22) Filed: Nov. 7, 2001

(65) Prior Publication Data
US 2005/0209914 A1 Sep. 22, 2005

Related U.S. Application Data

(63) Continuation-in-part of application No. 09/597,969, filed on Jun. 20, 2000, now abandoned.

(60) Provisional application No. 60/140,525, filed on Jun. 22, 1999, provisional application No. 60/246,800, filed on Nov. 7, 2000, provisional application No. 60/275,530, filed on Mar. 12, 2001, provisional application No. 60/293,650, filed on May 24, 2001, provisional application No. 60/314,594, filed on Aug. 23, 2001.

(51) Int. Cl.
*G06F 17/00* (2006.01)
*G06F 17/30* (2006.01)
*G06F 15/16* (2006.01)

(52) U.S. Cl. .................. 715/200; 715/205; 715/234; 715/752; 709/203; 705/5; 705/10

(58) Field of Classification Search .................. 705/14, 705/26, 4, 5, 9, 10; 715/200, 205, 234, 805, 715/201, 202, 256, 751–753, 760; 709/203
See application file for complete search history.

(56) References Cited

U.S. PATENT DOCUMENTS 5,528,745 A * 6/1996 King et al. .................. 715/753

(Continued)

OTHER PUBLICATIONS

Dialog file 275 # 02166641, Bordan, Susan, "Contacts for the Web and desktop," Computer Shopper, Jan. 1998, p. 506, v. 18, No. 1.

(Continued)

*Primary Examiner*—Doug Hutton
*Assistant Examiner*—Maikhanh Nguyen
(74) *Attorney, Agent, or Firm*—Fenwick & West LLP

(57) ABSTRACT

The present invention is a method and apparatus for providing enterprise event marketing and management automation. A website is provided that includes online tools for event marketing and management. A user in communication with the website is allowed to create and event page and a registration page associated with the event page, utilizing the online tools. The event page includes a link to the registration page. The event page is forwarded to a participant to enable the participant to establish communication with the registration page utilizing the link. The registration page is forwarded to the participant to be completed and returned in response to the communication and a confirmation is communicated the participant in response to receiving the registration page and response. Information received from the participant is communicated to the user in order to allow for further event organization and management.

64 Claims, 11 Drawing Sheets

U.S. PATENT DOCUMENTS

| | | | | |
|---|---|---|---|---|
| 5,855,006 | A * | 12/1998 | Huemoeller et al. | 705/9 |
| 5,948,040 | A * | 9/1999 | DeLorme et al. | 701/201 |
| 5,960,406 | A | 9/1999 | Rasansky et al. | |
| 6,026,430 | A * | 2/2000 | Butman et al. | 709/203 |
| 6,029,141 | A * | 2/2000 | Bezos et al. | 705/27 |
| 6,253,998 | B1 | 7/2001 | Ziarno | |
| 6,507,870 | B1 * | 1/2003 | Yokell et al. | 709/225 |
| 6,778,807 | B1 * | 8/2004 | Martino et al. | 434/362 |
| 6,826,540 | B1 * | 11/2004 | Plantec et al. | 705/10 |
| 7,010,530 | B2 * | 3/2006 | Bartkowiak et al. | 707/9 |
| 2001/0014865 | A1 * | 8/2001 | Franke | 705/1 |
| 2002/0002482 | A1 * | 1/2002 | Thomas | 705/10 |
| 2002/0016729 | A1 * | 2/2002 | Breitenbach et al. | 705/9 |
| 2002/0035632 | A1 * | 3/2002 | Matsumoto | 709/229 |
| 2002/0082960 | A1 * | 6/2002 | Goedken | 705/35 |
| 2002/0111845 | A1 * | 8/2002 | Chong | 705/8 |
| 2002/0128934 | A1 * | 9/2002 | Shaer | 705/27 |
| 2002/0154178 | A1 * | 10/2002 | Barnett et al. | 345/853 |
| 2002/0156787 | A1 * | 10/2002 | Jameson et al. | 707/10 |
| 2002/0169826 | A1 * | 11/2002 | Yano et al. | 709/203 |
| 2002/0178041 | A1 * | 11/2002 | Krantz et al. | 705/8 |
| 2003/0055724 | A1 * | 3/2003 | Battin et al. | 705/14 |
| 2003/0083962 | A1 * | 5/2003 | Araki et al. | 705/27 |
| 2004/0049538 | A1 * | 3/2004 | Akamatsu et al. | 709/203 |

OTHER PUBLICATIONS

Proquest document, "Evite.com Launches free web-based group activity organizer," Jul. 19, 1999, [online] [Retrieved on Aug. 11, 2005] Retrieved on the Internet<URL:http://proquest.umi.com/pqdweb?sid=13&vinst=PROD&fmt=3&startpage=-1&clientid=19...>.

Dialog reference, file 810 #0747709 "Leukemia Society: Cocktail Party to Benefit Linsey Smith—10 year old Leukemia Patient," Sep. 18, 1997, News/assignment/Lifestyle Editors and Health/Medical Writers.

Dialog reference, file 613 #00184206 "seeUthere.com Launches First End-to-End Online Event Planning Site," Sep. 28, 1999, PR Newswire.

* cited by examiner

Sample Attendee Agenda

(126) Attendee Name: John Smith (128) Event Name: ABC 5th Annual National Sales Training Conference (130) Event Date: April 3 – 5, 2001

Registration Details (132)

| Registration (138) | Date & Time (140) | Amount (142) |
|---|---|---|
| Opening Session (Mandatory) | 4/3/2001 9:00 AM | $0.00 |
| Sales Strategy Seminar | 4/3/2001 2:00 PM | $100.00 |
| Dinner with VP of Sales | 4/3/2001 7:00 PM | $0.00 |
| Selling Seminar | 4/4/2001 9:00 AM | $200.00 |
| Top Salesperson Award | 4/4/2001 6:00 PM | $0.00 |
| Sales and Marketing Training | 4/5/2001 9:00AM-3:00 PM | $300.00 |
| Closing Reception | 4/5/2001 5:00 PM | $0.00 |

Questions and Answers (134)

| Question (144) | Answer (146) |
|---|---|
| What is your shirt size? | Large |
| What's your selling territory? | West Coast |
| Did you attend last year's conference? | No |
| Do you need pick up at the airport? | Yes |

Meal Preferences (136)

| Meal Name (148) | Meal Selection (150) | Answer (152) |
|---|---|---|
| Dinner with VP of Sales | Appetizer | Crab Cake |
|  | Entrée | Salmon |
|  | Dessert | Cheesecake |
| Top Salesperson Award | Appetizer | None |
|  | Entrée | Chicken Pasta |
|  | Dessert | Apple Pie |
| Closing Reception | Appetizer | Stuffed Mushroom |
|  | Entrée | Filet Mignon |
|  | Dessert | Fruit Tart |

FIG. 9

SYSTEM AND METHOD FOR ENTERPRISE EVENT MARKETING AND MANAGEMENT AUTOMATION

CROSS REFERENCE TO RELATED APPLICATIONS

The present application is a continuation-in-part of a parent application Ser. No. 09/597,969, filed Jun. 20, 2000, now abandoned entitled "EVENT PLANNING SYSTEM", assigned to the assignee of the present invention, incorporated herein by reference and claiming priority from U.S. Provisional Application No. 60/140,525, filed Jun. 22, 1999.

Furthermore, the present application claims the benefit of U.S. Provisional Application Nos. 60/246,800 filed Nov. 7, 2000, 60/275,530 filed Mar. 12, 2001, 60/293,650 filed May 24, 2001, and 60/314,594, filed Aug. 23, 2001, all of which are incorporated herein by reference.

FIELD OF THE INVENTION

The present invention relates to event planning and more particularly to a system and method for automated enterprise event organization and management.

BACKGROUND OF THE INVENTION

The professional meetings and events industry in the U.S. is valued at over $100 billion a year and is the $22^{nd}$ largest contributor to the U.S. gross national product. In fact, for many organizations, events represent important customer interactions that are effective in acquiring, educating, and building loyalty among customers.

Currently, most events are managed as isolated projects in different departments and divisions. Most of the customer data gained from the events is not incorporated into companies' customer knowledge bases. While events are an important part of companies' sales and marketing programs, they are generally managed on a project-by-project bases, with little consistency in capturing metrics that integrate with other customer relationship management programs.

Further, event planning requires a great deal of legwork. Gathering a group of people together is a large part of planning the event itself. Dates need to be chosen, locations need to be selected, etc. An event communication tool is needed that increases visibility and attendance of events. Further needed is an event planning service that provides feedback and reports about event participants, revenue, etc.

SUMMARY OF THE INVENTION

Accordingly, it is an object of the present invention to provide an automated enterprise event organization and management system and method.

It is another object of the present invention to provide fee collection and ticketing services to an event planner with respect to event participants.

It is a further object of the present invention to provide marketing, registration, participant management, and data analysis with respect to an event.

Briefly, a preferred embodiment of the present invention is a method and apparatus for providing enterprise event marketing and management automation. A website is provided that includes online tools for event marketing and management. A user in communication with the website is allowed to create and event page and a registration page associated with the event page, utilizing the online tools. The event page includes a link to the registration page. The event page is forwarded to a participant to enable the participant to establish communication with the registration page utilizing the link. The registration page is forwarded to the participant to be completed and returned in response to the communication and a confirmation is communicated the participant in response to receiving the registration page and response. Information received from the participant is communicated to the user in order to allow for further event marketing and management.

An advantage of the present invention is that it increases event visibility and participant attendance.

Another advantage of the present invention is that it allows a user to customize event registration and modify an event depending upon participant response.

A further advantage of the present invention is an event planner may utilize existing contact files to generate an invite list associated with a particular event.

Still another advantage of the present invention is an event planner can utilize event and registration information from previous events in future events.

Another advantage of the present invention is an event planner can query a participant for information associated with event attendance in order to schedule activities for event participant guests, assist with accommodations and travel plans, focus the subject matter of the event, etc.

Yet another advantage of the present invention is the event planner can choose to pass transaction fees to the event participant or absorb the transaction fees.

A further advantage of the present invention is that the event planner can collect payment from event participants and issue tickets to participants. Still another advantage of the present invention is that event planner's can provide promotion codes to participants that can be utilized to discount or avoid payment for a particular event.

Another advantage of the present invention is the meeting and travel budget savings to users of the system.

These and other objects and advantages of the present invention will no doubt become apparent after reading the following detailed description of a (the) preferred embodiment(s) which is (are) illustrated in (the several figures of) the drawing.

BRIEF DESCRIPTION OF THE DRAWINGS

The invention will be better understood when consideration is given to the following detailed description thereof. Such description makes reference to the annexed drawings wherein:

FIG. 9 illustrates a sample attendee agenda in accordance with the present invention;

BEST MODE FOR CARRYING OUT THE INVENTION

The present invention is a system and method for providing enterprise meeting creation and management. A preferred embodiment of the present invention is illustrated in FIGS. 1-8.

Figure 1:
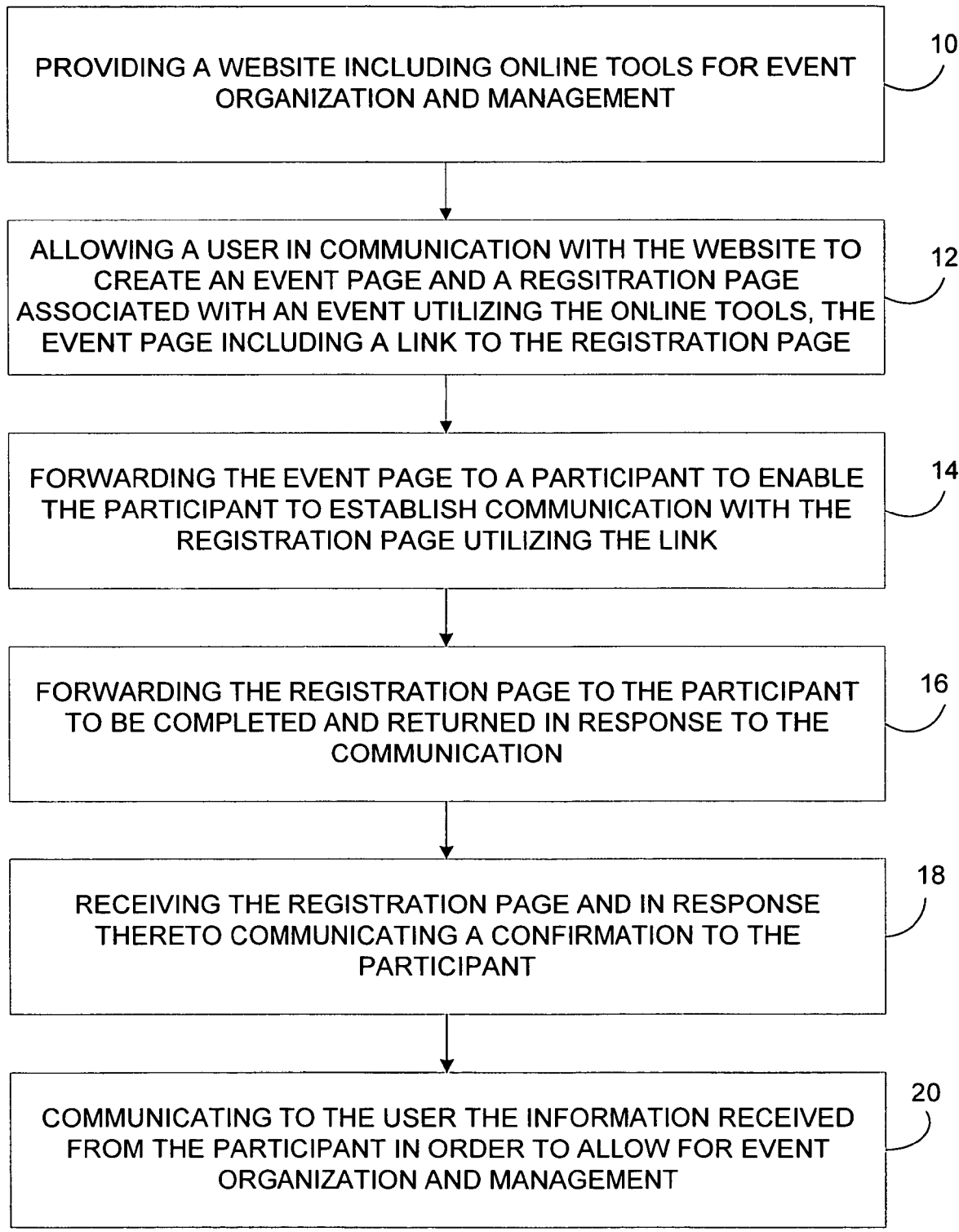
FIG. 1 is a flowchart illustrating a method for providing automated enterprise meeting creation and management.

FIG. 1 is a flowchart illustrating a method for providing enterprise event marketing and management automation. The present invention further allows for automated enterprise event organization and management. A website is provided that includes online tools for event marketing and management (Block 10). A user in communication with the website is allowed to create and event page and a registration page associated with the event page, utilizing the online tools (Block 12). The event page includes a link to the registration page. A previously created event page can be utilized to create a new event page and/or registration page. A template can be used to create the registration page as well. The event page is forwarded to a participant to enable the participant to establish communication with the registration page utilizing the link (Block 14). The participant may be queried for information associated with participant attendance to the event, such as travel information, shirt size, meal preference, etc. The registration page is forwarded to the participant to be completed and returned in response to the communication (Block 16) and a confirmation is communicated the participant in response to receiving the registration page and response (Block 18). The confirmation may include a ticket for admission to the event. Information received from the participant is communicated to the user in order to allow for further event marketing and management (Block 20). A report about the event can be generated for the participant and/or user, such as a list of events for which the participant is registered or a list of attendees for the user.

A fee may be associated with the event. The fee may be collected in response to receiving the completed registration page from the participant. The user can also associate a promotion code with the event.

A contact file of the user may be stored. The participant can be selected from the stored contact file. The stored file can be imported from another source. The contact file can also be exported. Participant parameters may be generated and the participant may be invited according to the participant parameters, rather than simply chosen from the contact list.

The event may have a maximum capacity. The user can receive a notification, such as an email, when a predetermined percentage of maximum capacity is reached. The user can modify the maximum capacity in response to the notification. Further, the participant may have the option of being waitlisted where the maximum capacity of the event has been reached.

A plurality of events can be grouped under a single event. The report generated for the user and/or participant may include information pertaining to budges, expenses, revenues, travel, accommodations, participant information, event details, attendance details, sub-organization, cross-events, profiling, scheduling, registration, change between data conveyed on specified dates or times (delta reporting), etc. The report may be generated according to a schedule. Further, the report can be generated utilizing a canned report or ad hoc. The user can be provided with data for tracking a budget, expenses, and/or revenue.

One or more events may be grouped into categories. Participants can be grouped. Further, a type may be assigned to a participant. Travel and accommodations may be provided according to the participant type. The participant may be provided with travel information and/or accommodation information. Travel can be arranged utilizing an online booking system. A login may also be provided to the participant. A survey may be forwarded to the participant. Information related to a guest of the participant may be received on the registration page completed by the participant.

Architecture

Figure 2:
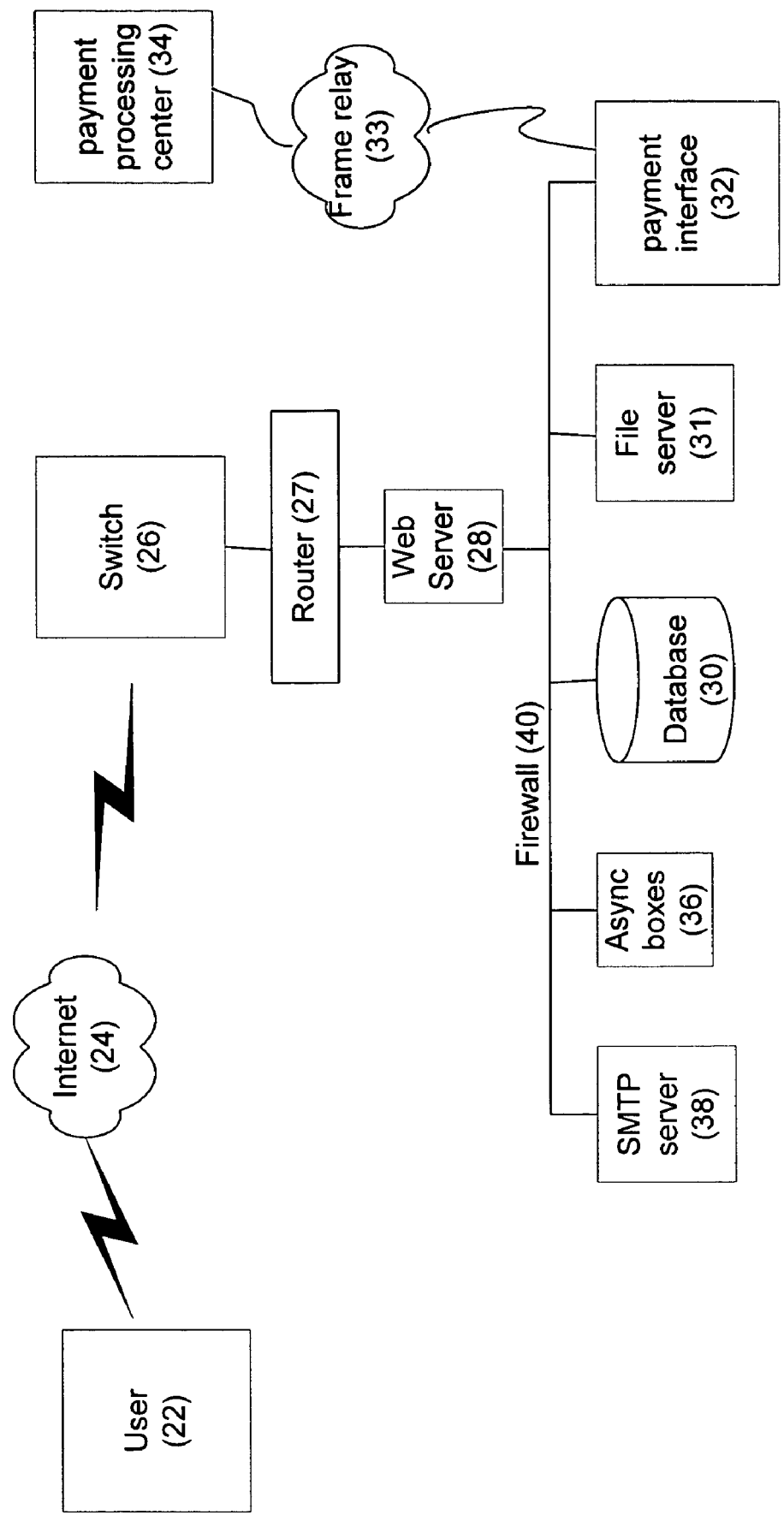
FIG. 2 is a schematic diagram of the system architecture for the enterprise meeting system in accordance with the present invention.

FIG. 2 is a schematic diagram of the system architecture for the enterprise event organization and management system. A user 22 may access an event planning services site of the present invention via the internet 24, via a switch 26 and a router 27. The switch 26 and router are connected to a web server 28 for delivering content from the web server 28 to the user 22 via a network, such as the Internet 24. The web server 28 includes a computer processor for executing a computer program and a computer-readable storage medium for storing an executable computer program. The web server 28 is connected to a database 30, a file server 31, and a payment service interface (i.e. paymentech) 32, the payment service interface 32 being connected to a frame relay 33 for processing payments via a payment processing center 34. A firewall 40 provides security between the web server 28 and the database system 30, the payment service interface 32, and the file server 31, as well as between the web server 28 and the async boxes 36 and an SMTP server 38 for sending out emails over the Internet 24.

A user in the present invention may include an event planner, or any user performing services on behalf of an event planner. For example, a user may be an administrator of a corporation who plans events on behalf of other corporations or companies. As another example, a user may be a user authorized to access the system by a system administrator that sets up authorizations, defines access limitations, etc. for other users.

Overview of Event and Registration Set Up

Figure 3:
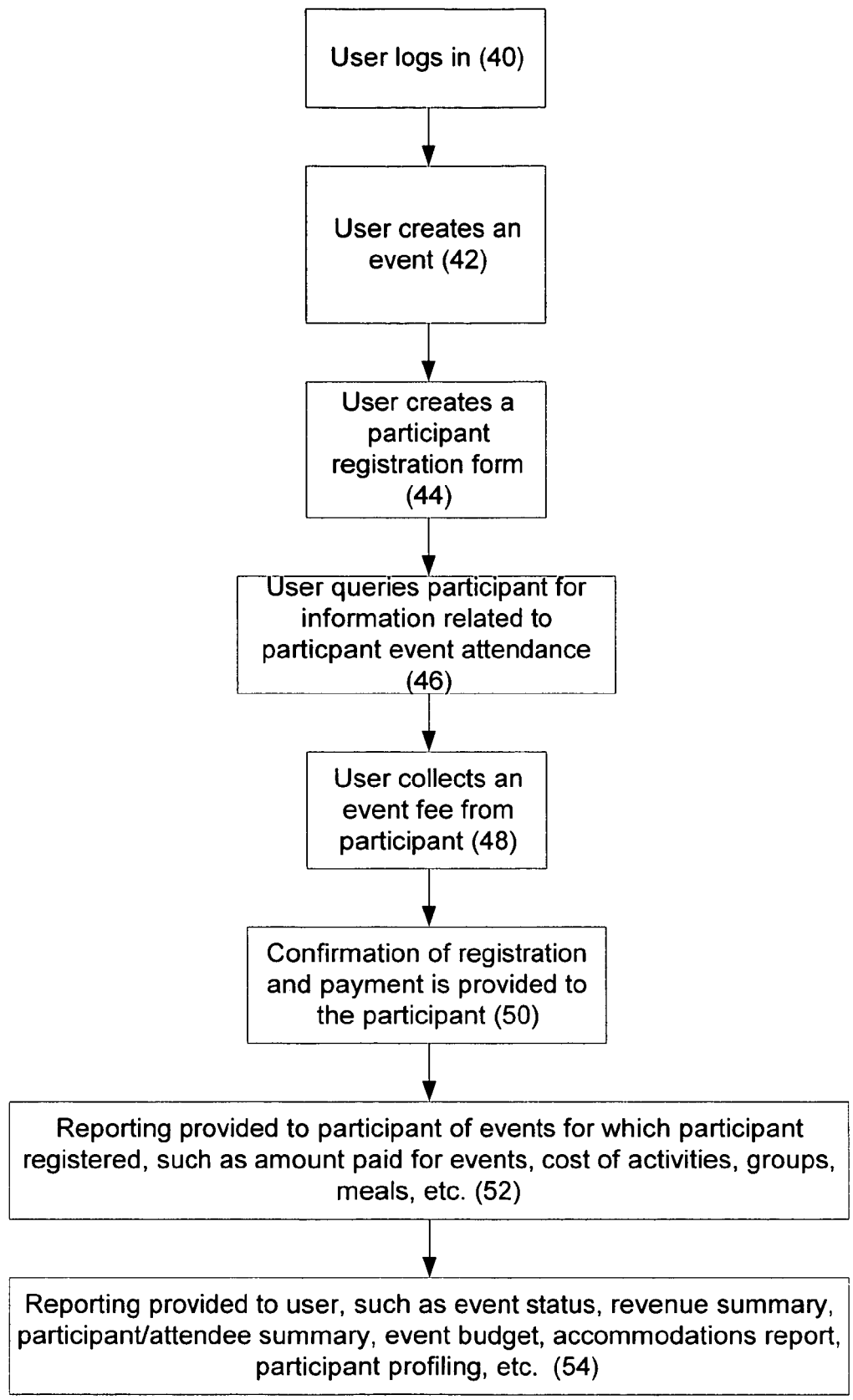
FIG. 3 is a flowchart illustrating user creation of an event and participant registration therefor in accordance with the present invention.

FIG. 3 is a flowchart illustrating user creation of an event and participant registration therefor in accordance with the present invention. A user, such as an event planner, logs in 40 to the event planning system. The user creates an event 42 once logged in. The user creates a participant registration form 44 and creates queries to pose to the participant to gather information related to the participant's attendance of the event 46. The user collects an event fee from the participant 48 following the participant's registration for the event and confirmation of registration and payment is provided to the participant 50. The participant may receive reports with respect to the events for which the participant enrolled 52, such reports including items such as the amount the participant paid for various events, the cost of activities associated with each event, groups included in the events, meals, etc. Reports may also be provided to the user 54 with respect to the events, such as the status of an event, a revenue summary, participant/attendee summary, event budget, accommodations report, participant profiling, etc. Numerous reports are available to the user, participant, and others as permitted by the system, and these reports will be discussed later in further detail.

A user may create an event using the event planning services or the user may separately create an event page and provide a link to a registration page for potential participants, the registration page being located at the event planning services site. User creation of an event will be discussed in further detail below.

Event Set Up

Figure 4:
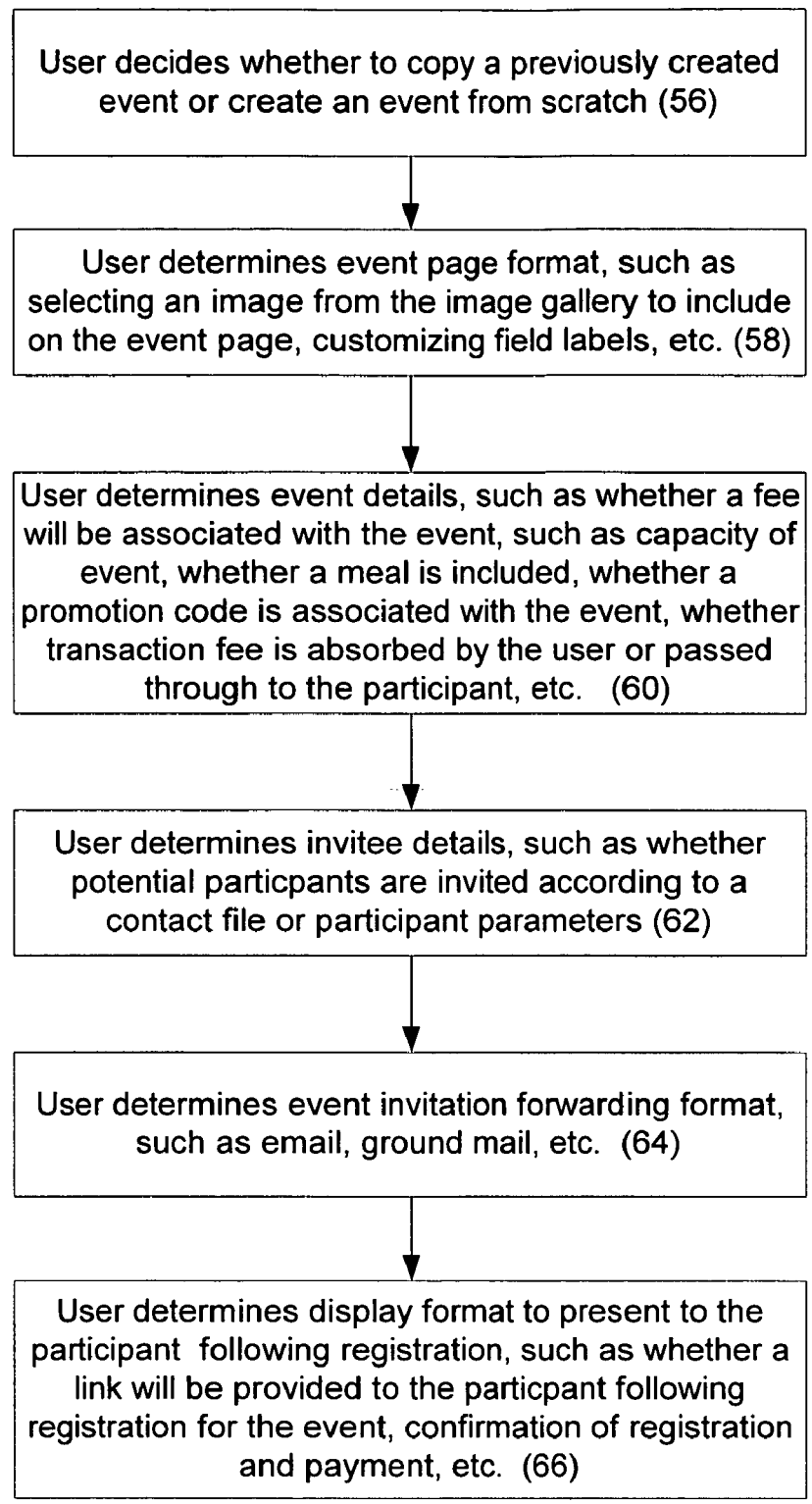
FIG. 4 is a flowchart illustrating event creation in accordance with the present invention.

FIG. 4 is a flowchart illustrating event creation in accordance with the present invention. The user decides whether to copy a previously created event or to create an event from scratch 56. The user further determines the event page format 58, such as selecting an image from the image gallery to include on the event page, customizing field labels, etc. The user also determines event details 60, such as whether a fee will be associated with the event, capacity of the event, whether a meal is included, whether a promotion code is associated with the event, whether a transaction fee is absorbed by the user or passed through to the participant, etc.

In addition, the user determines invitee (i.e. potential participant) details 62, such as whether potential participants are invited according to a contact file or participant parameters. The event invitation forwarding format is also determined by the user 64, such as forwarding the invitation to potential participants via email, ground mail, etc. The display format to present to a participant following registration for an event is also determined by the user 66, such as whether a link will be provided to the participant following registration for the event, confirmation of registration and payment, etc.

The event page can be formatted at the user's instruction. The user can select images to include on the event page from an image gallery, or import images from another source. The user may wish to include images to reflect the event, such as the scales for a legal issues in business seminar. As another example, a user may choose to include a photo of an engaged couple on an event page where the event is a wedding. Various images may be selected for presentation on an event page, or the user may choose not to include an image at all.

Further, the user can organize personal images into a private image gallery. The user can create directories where the images are organized. The directory structure can appear similar to the directory structure on the main image gallery and can be two layers deep or more if needed. The user can select images to be deleted from the image gallery.

The user can also customize the field labels on the event page to include phrases such as "Hello", "You are invited to", "Hosted by", "When", "Location", "Event details," etc. In order to select, change, or delete field labels, the user goes to the event page and chooses the option to customize field label. The user may choose to display or hide the specific fields. Further, the user can insert HTML tags in the label fields to change label font. The formatting of the field labels may be changed and the user can also highlight a block of text and change font, size, style, etc.

The user can create/use a single web page as a portal to multiple events that are somehow related. A "multiple events" page can contain links to individual event pages. The text, html tags, images (header, main, footer) may be customizable in the same manner as is the event page. Optionally, an umbrella event name and time period may be entered. A single invitation can be sent out, including links for each of the events, the invitation email being customizable as well.

Multiple event pages can be created for a single event. For example, a user may want to test different marketing messages, or have separate pages for exhibitors, speakers, staff, etc. By presenting multiple event pages, the user can market to specific populations.

The event pages for the single event may be readily created by the user. The user can create a single page and make copies of the page for subsequent pages. Each page may be activated one at a time, or all together. A distinct invitee list may be created for each event page. Entries across invitee lists can be de-duplicated to ensure that no one receives more than one invitation. RSVP and guest status can be tracked at the event page level and/or the RSVP responses can be merged into a single summary.

The user may want to send out a single email that contains information and invitation for a number of events, such as a monthly newsletter. The user may also have mail merge capability beyond a person's name. For instance, the user may want to merge Q&A responses from an event or survey with his custom text.

The user can take the event page offline to make modifications. For example, the user may know that registration capacity is about to be reached and bring the site offline to increase capacity. The user can thus suspend and un-suspend the event page. If a registrant goes to the event page while a site is suspended, the registrant can receive some notification that the site is temporarily unavailable.

The user may create an event that recurs on a regular schedule, such as a monthly meeting for a professional association. When the user organizes the event using the online tools (i.e. creates the event), the user can choose to make it a recurring event a set a schedule for it, such as daily, x day each week, x day each month, etc. The user can easily put the event on/off the schedule, or cancel a specific instance, at anytime. If the user cancels and instance or entire series, the user can choose to send cancellation notification to the attendees, invitees, and/or guests. The user may want to schedule when the invitation is to be sent out, such as one week before the event, one month before the event, etc.

A drop down menu, in the broadcast email function, may list events for the user. The default for the menu can state "not applicable" if the user navigated there from the "communication" link at the horizontal toolbar. Similarly, the drop down default can appear if the user arrives at the page from the event summary page for a given event.

The user can check checkboxes that allow the user to send email to attendees, declinees, no responses, guests, etc. The user can check the appropriate box for generating the recipient list for this email. An area for "send broadcast email", such as in a vertical toolbar, can exist in the event summary area for a given event. By clicking on this link, the user can be sent to the broadcast email function with the event name pre-populated in the event drop down menu above. The subject for the email can also be pre-populated with the event name.

Each new account can include one or more generic events already set up as examples that can be copied by the user to help facilitate the event creation/organization process. The generic events can range in complexity, from simple events to multiple track, complex events.

Fees and Payments Associated with Events and Event Planning Services

In determining whether a fee is associated with the event, many other determinations regarding such event details may also need to be made. The user can associate with the event a fee, or the event can be free of charge and thus have no fee associated therewith. The event planning services site charges a fee to the user for participant registration. This "transaction fee" may be absorbed by the user creating the event or the user may pass the fee on to the participant registering for the event. In order to select an option regarding the transaction fee, the user can go to "advanced options" during the event creation process and choose whether to absorb the event planning service transaction fee or pass the fee through to the registrant (i.e. participant). When the participant registers for the event, the participant sees the transaction fee on the registration summary page. Registration pages will be discussed in detail below.

If the user decides to absorb the transaction fee, a "0" can appear on the registration summary page and a registration confirmation page. In a report to the user, an indication of whether the event was set up for the user to absorb the transaction fee or for the transaction fee to be passed on to the participant may be included in the report.

The user can allow people to be billed later when they register online. Such a postponed payment or billing system feature can be enabled during the registration setup process. Once the user enables such a feature, the participant/respondent may see the option "bill me later." A message on the event page or registration page can convey the deadline for submitting checks or other payments, and to whom and where to send payments. If the registrant chooses to be billed later, qualifying information may be requested from the registrant. A confirmatory email can reflect that the participant/registrant will be billed later or that the registrant will need to submit a check.

The event planner/user can mail the bill or confirmation email in hardcopy to the participant. Further, the user can view in the revenue summary the portion that is outstanding. The report can also include whose payments are outstanding. The registration can be marked as paid for each registrant that mailed in the check. Further, an automated notification can be sent to the user as the deadline approaches so that the user can proactively collect payment. If the registrant fails to submit the payment, the user can cancel the registration. If this occurs, the registrant can be notified that the registration has been cancelled, such as via an email message.

The registration page can include various payment options, as previously discussed. The registrant can pay via credit card or mail a check or money order to the user, or be billed by the user. Furthermore, foreign currencies can be supported. However, the options on the registration page can include, in addition to credit card billing, invoice me, check, etc. The registrant can forward a check, etc. to the event system service. The user may choose for the event system service to handle all payments in order to alleviate the user of this task.

If the registrant elects to send in a check, s/he will be provided with an address where a check can be forwarded. The system can capture a P.O. number during registration and any check forwarded will be processed against an invoice, should the registrant ask to be invoiced. Reminders can be sent to those who have not yet paid in full.

The user can view check and other payment information in an online summary. Statistics that may be included in the summary are the number of registrations by check, the number of invoices sent, the amount of registrations and dollars outstanding (i.e. accounts receivable) via invoice or via check, the amount of registrations dollars processed via checks or invoice, the name and registration details of those that paid by check or invoice, the name list of registrants with an indicator of payment option, etc. The user can generate and download the statistic report, as ell as select a time frame for the report.

The user can offer variable price amount on registrations. The amounts can be categorized as donation amounts. The registration pages can then be leveraged as a donation mechanism so that users can access profiling capabilities to analyze donation data.

Promotion Codes

The user can also set up promotion code pricing in the registration set-up. Promotion code pricing allows for discounted or free entry for events and activities and groups that are part of an event. A meal widget on the registration set-up page can allow a user to include meals in the promotion code pricing. The promotion code pricing parameter is added to the meal widget to accomplish this end. When the participant enters a promotion code, the participant will receive promotion code pricing for the event, activities, for the group in which the participant is a member, meals, etc. dependent upon the parameters of the promotion code. The promotion code price for the particular item may be reported with that items revenue, such as reporting the promotion code price for the meal with meal revenue.

The promotion code can be set up independently of the regular price, for each activity, group, and/or meal. The user also has the option of setting a percentage discount that applies for a particular promotion-code across all activities, groups, and/or meals. For example, promotion code "123" may signify 50% off the regular price for all activities, groups, and/or meals.

Further, the user can enter into the system a promotion code that provides free entry to the event. This can actually allow the participant free entry to the event, at the user's discretion, or can allow the user to process payment, as discussed above, rather than payment being processed through the system. In addition, the user can provide to participants promotion codes allowing the particular participants to register for and attend an event at no charge. The promotion code may also provide a discount so that participants entering promotion codes provided by the user receive a percentage off the normal registration fee. The system may also be configured so that the user can register for any participant without having to use any promotion code, the participant being later charged by the system or by the user.

Promotion codes may be utilized for other purposes as well. For example, the user may provide promotion codes to participants allowing for free or discounted meals at the event. As another example, promotion codes may allow for free guest attendance to an event, or an activity scheduled for a guest during the primary participant's event, etc.

Revenue and Expenses

Another source of revenue may be for the event pages to serve ads. Of course, the event planning services site may itself serve ads, but so may the user on the event page created. Furthermore, information about the event planning services site itself, such as a logo image, etc. may appear on the event page created by a user, serving as an advertisement for the event planning services system. The user can define a URL from which to retrieve advertising to the footer image, the company logo area of the event page, etc. The advertising can rotate on a page by page view basis. Ads can also be displayed on the confirmation page, emails sent by users regarding event, etc.

Sell-up and/or pop-up messages can be included on various user viewable and registrant/invitee viewable pages. The images can be shown in multiple areas, such as during event creation, the address book, reporting, communications, etc. They can also be added to the event page, the invitation email, confirmation emails, etc.

The user can organize budgeting and track expenditures for events. The user can determine how much was spent on items, as well as the return on his investment. Such information may be useful for a variety of reasons, such as future planning and forecasting. The data can be used over an extended period of time, across a set of events, for trend analysis, etc.

An "item master" list for items or services that are frequently purchased may be provided. Further, a standard cost may be assigned to each item or service. Such information may be useful for forecasting expenditures and tracking costs over time.

The event planning services system expense and registration revenue records can automatically be generated. The event planning services expense can accumulate into a single expense record. Likewise, the event planning services registration revenues can accumulate into a single record. The event planning services expenses may include transaction fees, processing fees, faxes, letters, postcards, professional services, etc. Change fees can be recorded and accumulated, per user option on an event-by-event basis. The event planning services revenue may include registration revenue, online and manually processed. Online and manually processed registration may be identifiable.

The user can gather expense and revenue information and transfer to the system easily. Through a collaboration feature, a task can be sent to people to fill out expense or revenue records. The task requests can take people into the budges/expense record section of the event planning services, where they can enter the records. Alternatively, and email can be sent with a pre-formatted spreadsheet to hotels and travel agency to report on expenses and revenue (list expense and revenue records) as an attachment. For an expense record, a field may be added for estimated expenditure. For instance, for accommodations, the user can reconcile actual expense against estimated expense against budget. For variance reports, a column can be added for estimated expenditure.

Contact Information

Figure 5:
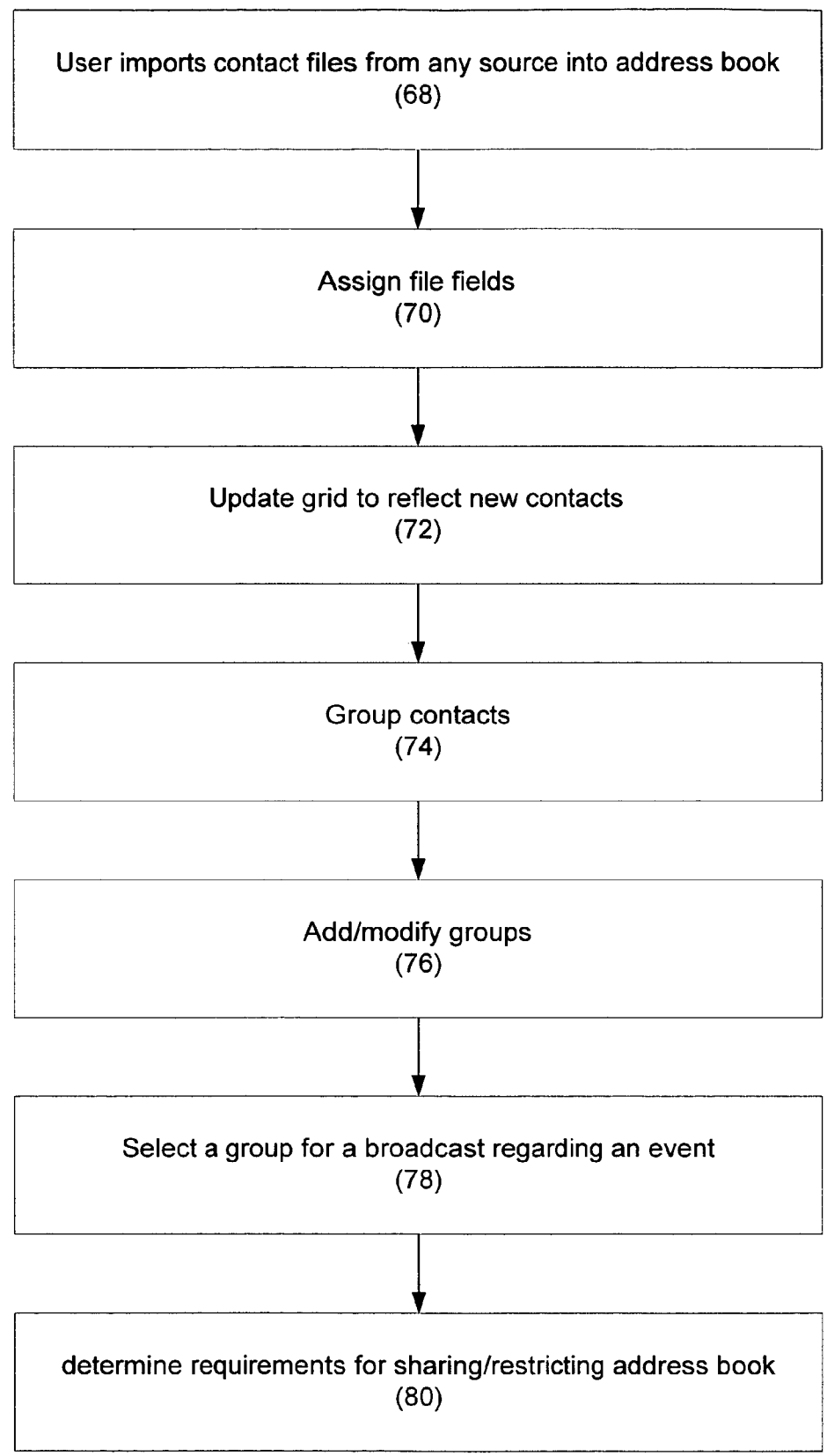
FIG. 5 is a flowchart illustrating importation of a contact file into an address book accessible vie the event planning services system in accordance with the present invention.

FIG. 5 is a flowchart illustrating importation of a contact file into an address book accessible vie the event planning services system in accordance with the present invention. The user imports contact files from any source into an address book 68. File fields are assigned 70 and a grid is updated to reflect new contacts 72. The contacts may be grouped 74 and groups may further be added and/or modified 76. A group for a broadcast regarding an event may be selected from the address book 78. Requirements for sharing and/or restricting access to the address book may also be determined 80.

Use of an address book for selecting invitees to an event (i.e. potential participants) can be very important, since selecting invitees is typically one of the first steps in the event planning process. Contacts may conveniently segmented into various categories and collections, simplifying the process of selecting a group of invitees for a particular event.

The address book can meld with a contact's event history, creating a single view into the database and allowing the event planner to query across events and contact information to create subsets of contacts. Contacts can be imported from any source, such as Outlook, etc., and placed into a general contacts list or into a new or existing group.

In order to import contacts from an application such as ACT or FileMaker, the user can export contacts to a .CSV, and quickly bring the contacts into the address book. The user can accomplish this quick process by browsing for the file, and proceeding to a mapping screen, where most primary fields are matched to the event planning services fields, even though the field names are not exactly the same. For fields that cannot be mapped, or that are incorrectly mapped, the field names can manually be mapped by using the pull-down menus. After saving the mapping so that it can be used again for this file format, the file is imported.

Imports with less than one thousand contacts can be processed synchronously. Larger imports can be processed asynchronously and email notification can be sent.

In order to collect contacts into different groups, the user can locate the grouping functionality menu entry. To create a new group, the user can select contacts from several existing groups to add to the new group. Both contacts that may be added and those already added to the group can be viewed. Furthermore, an advanced query can be utilized to select contacts residing in a particular region that have answered appropriately to questions posed in registrations for events. For example, contacts may be chosen for a group depending on answers to questions regarding the size of the company, areas of interest, etc. The contacts can then be added to a new group used to invite attendance at, for example, a seminar highlighting a new product.

The user can run reports or search data and group the list of attendees as well. For example, the user can create a new group of contacts based on report results using a "group participants" button on reports including attendee results. Such a button may also be available on results of a data search. The user can group selected participants from the results into a new group or place participants into existing groups. The user can send communications to these new groups, or new individuals within an existing group, the communication capable of being tracked for campaign management, for instance.

A contact may be counted as one, regardless of how many events the contact attended or surveys filled out. The user can easily search for a specific participant/contact and easily access information, such as the contact record (i.e. address, email, etc.) and/or all correspondence to the contact, such as events/RSVP results, survey results, Q&A responses for registrations.

Potential participants, or invitees, may be invited to the event according to the invitees' inclusion on the invite list, or according to the participants' meeting certain parameters set forth by the user creating the event. For example, potential participants may be invited because they are in the contact file of the user, or they may be invited because they meet the parameter of individuals working in the software development industry, for instance. The user can create any number of parameters for inviting potential participants to an event.

A field can be included in the contact information of the address book where the user can indicate the language preference of a particular contact. The user can choose the language preference from a list of languages offered by the browsers. The language preference chosen can be sent in the header of the invitation emails so that the invitation will appear in the language type the particular invitee has defined. The receiving browser may automatically update the language setting to match that of the incoming message. By this feature, the email reader will not be shown unreadable text, such as when a browser is set to a certain language that does not meet the language of the incoming message.

Another possibility of parameters for inviting potential participants to an event is to send out a broadcast email. The user may want to send an email that may or may not be associated with a specific event to a group audience. The group may be derived based on questions and answer responses, or other searches, and a custom email may be sent to the group once derived. The custom email can include branding, HTML, custom text, etc. The user can preview the email prior to distribution and can also view email that has been sent. Normal email functions, such as attaching a document to the email, customizing the subject, etc. can be accomplished using the broadcast email format.

The user can use a transaction log to view items associated with a contact/invitee. The user can view a detailed history of the contact with specific registrants or invitees. For a particular contact, the user can access when a message was sent out to a particular contact, by what medium the message was sent, such as email, postcard, letter, etc., and what was the purpose of that message, such as event invitation, broadcast email, etc. The user can view the contents of the message as well, and print out the list of messages or export the list to their email address.

An option can exist that prevents users from importing duplicate data. For example, a user may import different contact lists, each contact list possibly including an overlap in contacts. Accordingly, an option can allow the user to match imported contacts with existing contacts, using a combination of email address, first and last name, company, and/or phone number. When contacts match, the user can choose to ignore the imported record or overwrite the existing record. At the user's option, any records that lack an email address can be placed in another group, so that the user knows to update that group with email addresses.

The user can create custom fields in the address book in addition to the standard fields. The custom fields may be global custom fields for all contacts. Once the custom fields are set up, the fields may be populated on the add contact page. Five present custom fields may be provided on a manage custom fields page, for example.

For import, the user can set up the custom fields in the event planning services address book prior to import. For export, the custom fields can be exported to a .csv file, for example. Since the standard fields are automatically mapped into the other contact applications, the best way may be to download the contacts into .csv file, then map them into the desired application. If this is the case, the user may need to map the fields from scratch instead of taking advantage of the automated mapping process. As previously discussed, categories may be assigned and/or selected for each contact. The user can add, edit, and/or remove custom fields. Once a custom field is removed, the contact information within those fields can automatically be moved to the "unassigned" field.

Registration

Figure 6:
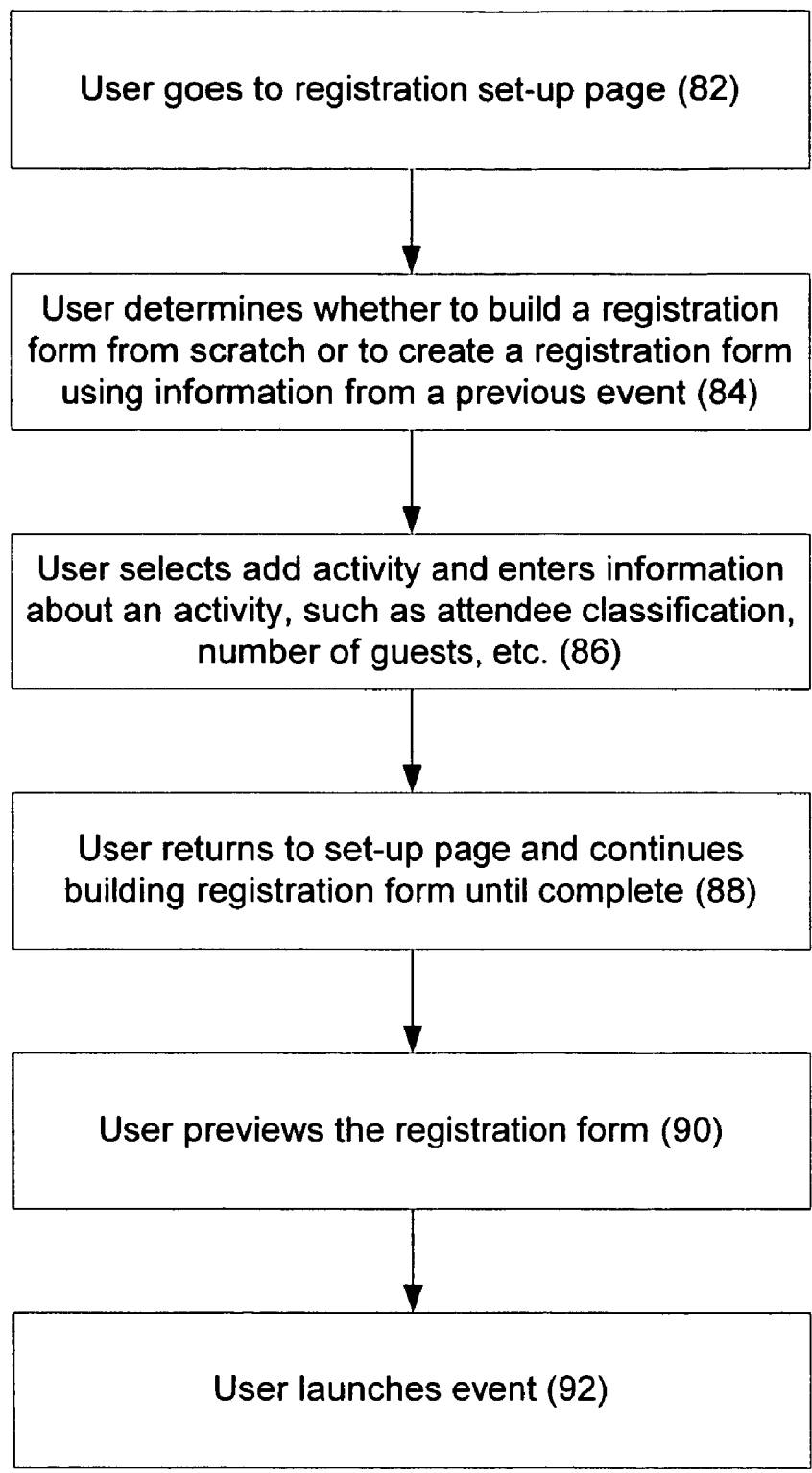
FIG. 6 is a flowchart illustrating registration for an event in accordance with the present invention.

FIG. 6 is a flowchart illustrating registration for an event in accordance with the present invention. The user goes to the registration set-up page 82 after creating an event. The user determines whether to build a registration form from scratch or to create a registration form using information from a previous event 84. The user selects add activity and enters information about an activity 86, such as attendee classification, number of guests, etc. The user then returns to the set-up page and continues building the registration form until it is complete 88. The user previews the registration form 90 and launches the event 92.

The user has the option of copying previously created registration setups. The user can copy an event that has a registration set-up, the registration set-up being copied along with the event page. The registration set-up from the prior event can then be utilized by the user for the current event. The user can use the set-up as is or make whatever modifications are necessary for the current event being organized by the user.

The user can also utilize a registration template to create a registration form for potential participants. The task of creating a registration form from scratch may be tedious, and using a previous registration set-up may not appropriately serve the user's need. Accordingly, the user may be better served by selecting a registration template. The registration template may be pre-populated with activities, groups, and so on, in order to streamline the process. The user can open the specific elements on the registration template and customize the content to suit the user's needs. Several pre-populated templates may be available to the user, including templates with various formats and templates for specific types of events, such as multi-track conferences, training seminars, company outings, etc. The template may include a grid pre-populated with registration policy, registrant information, activities, groups, meals, question and answer section, etc.

The user selects add activity to set-up an activity and can proceed to enter information such as the name, description, time, capacity, early/final registration prices, promotion code prices, etc. The information is submitted and the user returns to the registration setup page.

The user may also wish to add text to the registration page. A text widget may allow the user to put generic text on the registration form. By this feature, the user can provide explanations or general comments to the participant completing the form. In order to create the text, the user goes to registration setup and selects the text widget and inputs the desired text. The text widget may be used to create a heading. Further, it may allow the user to input HTML tags as well as text to customize the format of the text.

The user can also set-up registration for guests. During activity set-up, the user can select whether the activity is registrant only, guest only, or joint participation. Registration for guests of the primary participant may be a requirement for many types of events, optional, or not offered at all. Corporate events, conferences, trade shows, alumni events, etc. may be typical events in which spouse/family activities may be offered, requiring registration therefor. Examples of guest activities may include tickets to nearby amusement parks or entertainment venues, joint dinners with participants, etc.

A guest activity may be made available to the guest only by the user, or made available to both the guest and participant. For example, a side trip while the participant is attending a workshop would typically only be made available to the guest. There may be multiple selections of guest activities available for a specific time period. Certain guest activities may require that the guest's name is associated with the signup, while other guest activities may not require this name association, such as tickets to a movie, etc.

The user can track the RSVP status of participants and guests via the event reporting function after the event is launched. The user can view the number of participants and guests that have signed up for each activity. Further, the user can view the name of each participant and the name of guests of each participant, as well as specific selection of the participant and guest(s).

The participant clicks on the register button to enter the registration page and views the registrant activities on the first page. At the end of the first page, a question may be presented asking if the participant wishes to add a guest. If the participant chooses yes, the Guest activity page will appear including activities defined as guest only or joint participation. This process may repeat until the participant stops adding guests or when a limit, pre-defined by the user, is reached. The participant submits the choices and is presented with a page containing a summary of the participant's selections.

If all the selections are correct, the participant submits again and is prompted to enter the credit card information. Upon successful completion of the credit card transaction, confirmation of registration and summary of the participant selections is displayed to the participant. The participant may print the record. Furthermore, the participant may also receive a confirmation email containing the summary of the participant's selections.

The participant can enroll a participant's guest(s) in an activity. The participant can see the activities for the guest(s) as well as the participant himself or herself on the confirmation pages after the registration form is submitted. The user may choose to print name badges for participants and guests.

Another feature the user can utilize is capacity notification. An event may be sold out without the user knowing about it. Thus, the user may choose to be notified when full capacity is about to be reached. By this feature, the user can embark on corrective actions such as increasing capacity.

The user can setup a notification parameter in the registration policy window. The user can choose to have n email sent to the user when x % of the capacity is reached. For example, the user may want to be notified when 85% or 95% of the capacity has been reached. When this threshold is reached, the user receives an email including the event name, event date, the activity, group, meal, accommodation that will run out of capacity soon. The user can proceed with appropriate corrective actions. For example, the user may order more food where the meal capacity is about to be reached, or increase maximum capacity of participants where the event is about to fill up, etc. The threshold chosen by the user can be changed or canceled at any time.

The user may register for a participant. In order to accomplish this, the user may decide to use offline registration in conjunction with online registration. For example, the user may take offline information, such as registration information via paper or phone, and enter it via the online registration form, and process payments with or without the payment processing center. In other words, the user can accept a check, cash, money order, etc. from the participant, or the user can enter the user's credit card information into the system. The report can distinguish between payment processing via the event planning services site and the payment processing center, and payments processed by the user. The user can print out the confirmation page and forward it to the participant/registrant as a receipt.

The participant may register for him/herself via phone. A significant percentage of people still do not have the ability to access the Internet. Thus, it is important to allow people to access registration for an event via other methods. As an example of an alternative registration method, a potential participant may call an 800 number. The participant can be taken through various activities and events available and respond whether they want to sign up for an event or activities associated with a particular event. If the event requires a fee, the participant can enter credit card information over the phone to pay for the event. The telephone system may also record participant information if the participant wishes to be contacted regarding future events.

The user can allow invitees to RSVP for event via interactive voice response (IVR). The user can toggle this service on/off at any point. The invitation email can contain directions on how to access IVR and the IVR enables people to register for free as well as paid events. The IVR can be made accessible to only people with invitation IDs. Further, IVR can handle Q&As from the event page and can handle registration for activities and meals. Ticket quantities of one or more can be handled via IVR. For a group, IVR can alert the invitee that an item (group) cannot be reserved/purchased via IVR, and can provide information to the invitee on how to register online or how to contact the user/event planner.

The user can specify a registration cutoff. The user can specify the cutoff by month, day, time of day, etc. The user can set an early, final event registration cutoff, as well as accommodation registration cutoff, down to the time of day. The time zone may also be specified by the user with respect to a time of day registration cutoff.

The participant/registrant/invitee/attendee can have an account. The attendee can log in and see a list of all events the attendee is attending. The attendee can change registration at this point as well, change his or her password, etc. Further, the attendees credit card information may be stored to facilitate one-click shopping.

When the attendee submits the original registration to an event, the attendee is prompted to create and "attendee account" and set a password. If the attendee already has an attendee account, this page will not be displayed. The attendee can choose to have the credit card information stored for future use.

The user can be automatically notified based on information provided by the registrant. In other words, Q&A responses, contact information, and/or activity signups can trigger a notification to the user, or to specific user roles. An automatic response to the registrant can also be triggered. The user can also set up an automatic question when the registrant registers inquiring as to whether or not the respondent has budget approval authority. A trigger for this response can also be set up so that anytime the registrant answers yes to such a question, an email is sent to a salesperson to follow up.

The user may want to have discretion to allow or disallow a registration to be submitted. For instance, the user may want to disallow registration for a course if the registrant has yet to complete the pre-requisites. Should the user desire this authorization type system, the user reviews the guest status as registrations stream in. On a case-by-case basis, the user can approve, or disapprove, registration. For a paid event, the approval can trigger a credit card transaction and the system can send a confirmation email to the registrant.

If the user rejects a registration, a custom message may be sent to the rejected registrant to explain why the registration was rejected. The message can be merged into a de-confirmation email that may be sent to the person.

The registrant can customize a badge for the event. During the registration, the system can query the registrant to input the content to his badge, such as name, title, company, etc. The input information is captured and used for badge printing later. The registrant can view the text of the badge by hitting a "preview badge" button on the registration page. A small pop-up window can appear with a preview of the badge. The badge information entered can be captured and included in the address book, part of the registration information, etc. The user may have the discretion to turn this feature on or off.

In order to ease the registrant's task of filling out an RSVP for the event, tabs may be included to provide sufficient context and direction for the registrant. Tabs may be provided for marking RSVP pages for registration, guests, accommodations, travel, check out, etc.

An onsite registration system can be used to allow attendees to register quickly and efficiently at the event, producing any materials necessary for admittance of that attendee, such as badges. If attendees have pre-registered, they can enter their name and the system will call up the rest of their registration information for confirmation. If the attendee has not pre-registered, the attendee can enter all information necessary for registration. The registration information and any payment information can be captured for later use.

Deployment of the onsite registration system can range from simply one laptop for registering attendees, and perhaps printing badges, to a local area network (LAN) connecting a bank of registration terminals used by attendees to several devices used by onsite staff to monitor badge printing and collect payments. Connectivity to a wide area network (WAN), such as the Internet, may also exist.

Several types of badges can be printed, such as plain paper badges, configurable to any combination of name, nickname, company, etc. Integration with common lead-retrieval systems may allow printing of badges with two-dimensional bar codes or magnetic stripes that contain the attendee's profile, ranging from contact details to extensive Q&A, for example.

In order to allow the user greater flexibility for guest registration, controls and setup features for guests can be separate from primary registration. This allows the user to make registration information mandatory or optional to meet the needs of the event. For example, when a user is planning an internal, family focused event like a company picnic or a housewarming, the user can collect the number of guests and their names but not want thinks like email addresses to be mandatory. Further, there may be mandatory activities for the primary registrant, but other social activities for the guests during those times as previously discussed. This feature allows the user to customize primary and guest registration to fit the needs of the user. A guest information link can open a page, like the registration policy page, where the user can select what contact information s/he wishes to collect from the guest.

An email can be sent to recipients based on their status of registration for an event. For example, recipients may receive an email depending upon whether they are registered to attend an event, they have declined to attend an event, or they have not responded to an invitation to attend an event. The user can also query from a profile of potential participants, attendee profile, to create a recipient group on an ad-hoc bases. A customized email can be sent to this group.

The format presented to the participant following registration for the event may be determined by the user. The page may include confirmation of registration, payment, event details, etc. Furthermore, a link may be provided on the page to another site, allowing the participant to follow the link to more details about a particular company or person, to information related to the event generally, to upcoming related events, etc. The user can define the link that will appear on the registration confirmation page during creation of the event. The participant clicks on the link located somewhere on the confirmation page and another browser is launched to the URL specified by the user.

Calendar

Various items can be viewed in registration set-up mode. For example, the calendar view in registration set-up can provide the schedule of activities in a graphical format for the user. When the user goes to the registration set-up to create the registration form, the user can click on a link for "Calendar view of activities" to see a daily calendar with a view of activities, groups, meals, etc., having defined dates and times. The calendar may also be viewed in modes other than daily mode, such as weekly and monthly modes. The elements can be modified from the calendar view and new elements can also be added using this display. One possible way for the user to create or change elements is by allowing the user to utilize a pull-down menu including each time-slot, where elements in the time slots can be added or modified.

In order to preview the event page and registration to check for errors and ensure all content is correct, the user can do a "dry run" of the event registration process to ensure information is correct and the registration process works as intended. The user can put the event in a "dry-run" state. While the event is in this state, it behaves as if it were activated. The invitee list running the event in this state is ideally no more than five. RSVP information may be cleared at any time to facilitate iterative dry-run cycles. RSVP-related reports, revenue reports, registration changes, etc. can function as though the event is activated. The text "dry-run" may be appended to the event name wherever the event name is displayed to alert the user to the event state.

In order to view upcoming events, the event planner can view a calendar. The calendar may include events, broadcast emails, survey/polls, action requests, etc. The user can display a specific type of item, or combination of items. For instance, events and action requests may be displayed. The user can also choose to enter an arbitrary item, or not such an item, in the calendar. The calendar may be viewed in various formats, such as by time of day, day, week, month, year, etc.

Registration Modification

Figure 7:
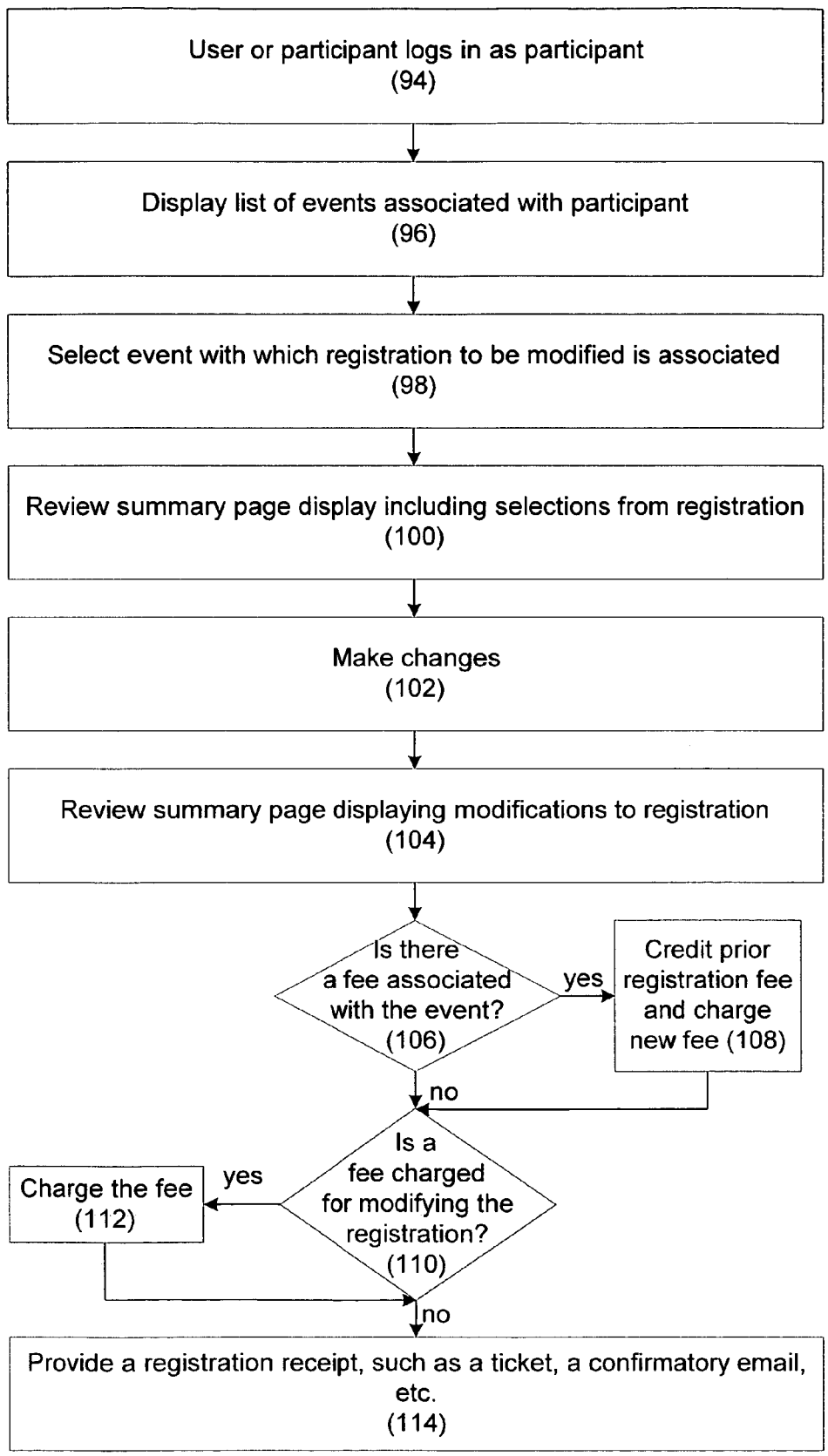
FIG. 7 is a flowchart illustrating a process for modifying an existing registration in accordance with the present invention.

The user or participant may need to modify information entered on the existing registration form for any of a variety of reasons. FIG. 7 is a flowchart illustrating a process for modifying an existing registration in accordance with the present invention. The participant can modify existing information or the user can modify the information on behalf of the participant. Optionally, the user can provide that the participant can only modify registration information as authorized by the user.

The user or the participant logs in as the participant 94. A list of events associated with the particular participant is displayed 96. The event with which the registration to be modified is associated is selected 98 by the user or participant and the user or participant reviews the summary page display including the selections from the registration 100. Changes are made 102 to the selections as required or requested by the participant. The summary page displaying the modifications to the registration is reviewed 104. If a fee is associated with the event 106, the previous registration fee is credited and the participant is charged a new registration fee 108. A fee may also be charged merely for making the change 110. If such a fee is applicable, the fee is charged 112. The participant is then provided with a registration receipt of some type 114, such as a ticket, a confirmatory email, etc.

The user can allow the participant to modify the participant's existing registration when the user builds the registration form. The user can set a registration change deadline, after which changes may no longer be allowed. As previously discussed, the user may also charge a change fee. A complete cancellation of the prior registration and an addition of the new registration can occur, resulting in two credit card transactions where a paid event is involved. An alternative is to include one transaction by setting the transaction value to the difference in value between the old and new registrations.

When the participant submits the original registration, the participant may be notified that (s)he now has an "attendee account" and the participant's initial password can be provided. If the participant already has an attendee account, this page may not be displayed. The password may also be used to restrict access to registration for an event. For example, the registrant may be required to present the password in order to register for an event.

A summary page may be presented to the participant or the user highlighting the new choices (i.e. the changes made). This page can also indicate to the user that the old fee will be credited and a new fee will be charged. Furthermore, the participant may also choose to change the password while in his or her attendee account.

A reset button may be provided for convenience. The reset button can allow the participant to reset the participant's changes to the default condition from which the participant came into the page. A separate button may also be provided to clear the fields so that they are blank and without settings.

Event Payment

Figure 8:
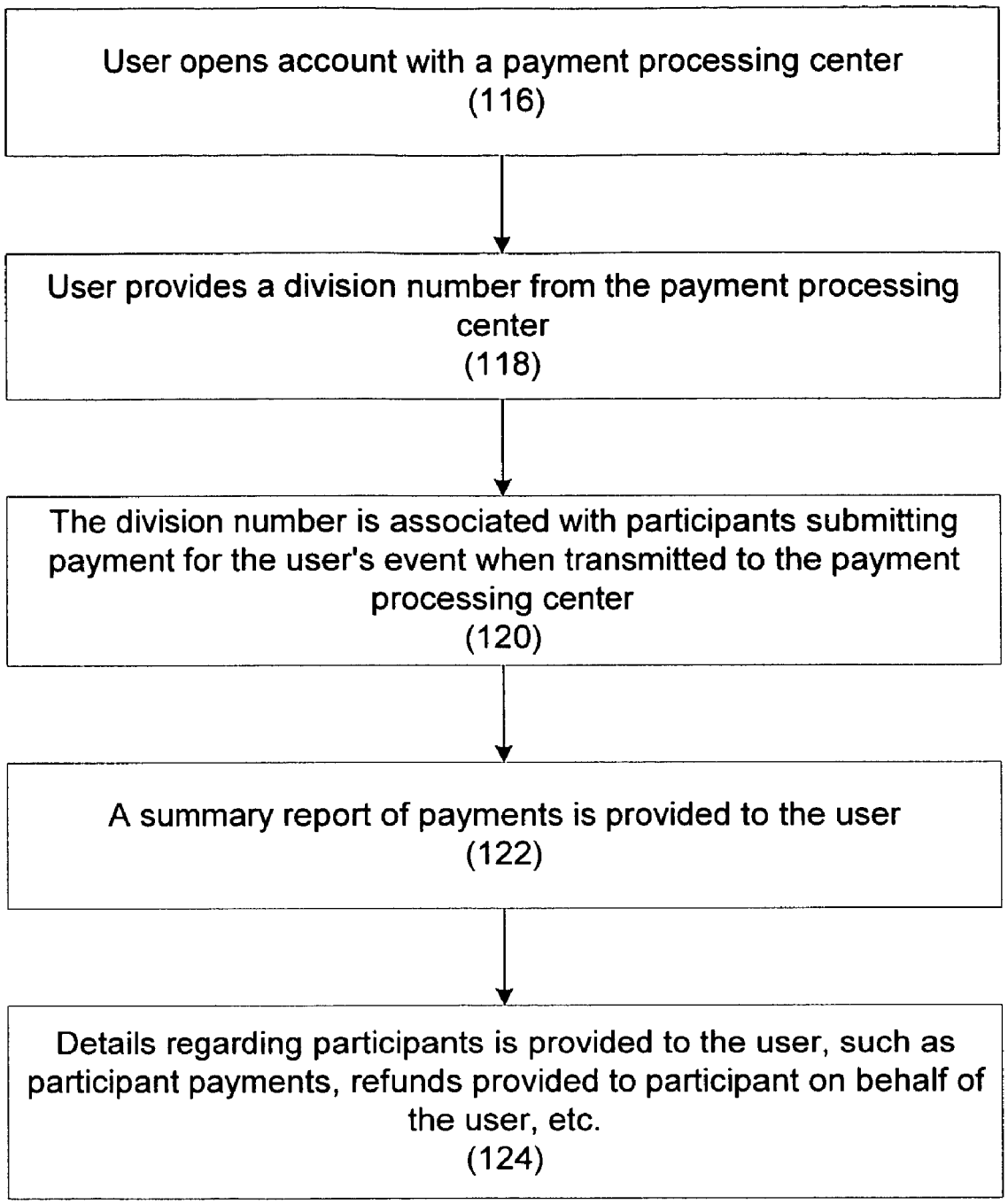
FIG. 8 is a flowchart illustrating the process for enabling payment for events.

FIG. 8 is a flowchart illustrating the process for enabling payment for events. The user opens an account with a payment processing center 116. The payment processing center provides to the user a division number 118. The division number is associated with participants submitting payment for a particular event of the user when transmitted to the payment processing center 120. A summary report of payments is provided to the user 122 and details regarding participants are also provided to the user 124, such as participant payments, refunds provided to the participant on behalf of the user, etc.

A user of the event planning services system may obtain their own merchant account with a payment processing center. Accordingly, credit card transactions made through the event planning services system can be deposited directly into the user's account. The event planning services system acts only as an agent in the transaction in this scenario.

By setting up a user account, the user can have immediate access to funds deposited therein. The transaction remains between the user and the participant, with chargebacks made against the user's account. An advantage of setting up a merchant account in this manner is that certain user's, such as political organizations, cannot accept an aggregated payment from the event planning services organization due to regulatory requirements. By allowing the user (i.e. event planner) of the political organization, to use the above example, set up a merchant account with the payment processing center, these types of lump sum payments can be avoided.

The summary report received by the user from the payment processing center lists the total deposited for a certain day, along with the number of transactions by credit card type. The Event planning services system then provides a detail level view of all transactions, including items such as participant name and amount, to the user. Accordingly, the user can identify each credit card transaction and associate the revenue with a particular participant/registrant. Since the user pay not have direct access to the payment system, the event planning system can issue refunds on behalf of the user.

Examples of Event Planning Environments

The enterprise event organization and management system (i.e. event planning services system) of the present invention can be utilized in various forums. For purposes of discussion, two examples are set forth below to illustrate environments for utilizing the present invention.

In a reseller network, a reseller may purchase a subscription from the event planning services site and resell the capability to a number of event planners (i.e. users), typically at corporations. The reseller may be providing a whole suite of event planning services to a company, such as venue selection, on-site logistics, etc. One piece of the suite can be online promotion and RSVP management, for example. By providing access to the event planning services site to the reseller's clients, or users, the reseller can allow them to participate in the event planning process as much as necessary. The user could import contacts and send invitations, or merely view the results of such actions performed by the reseller. Thus, either or both the reseller and client may be users of the system. The reseller can ensure that no data is shared between clients, and the reseller may further wish to limit the permissions granted to their clients.

In a corporate environment, users of the system may want to control which data is shared, including access to the address book and events. Permissions may vary across uses.

In the corporate scenario, a company may purchase a subscription to the event planning services system. The company can have a single account with the event planning services organization, but allow multiple users of the system. Typically, when the account is created, a single user or a group of users are designated as administrator. The administrator(s) may be the only user(s) permitted to alter account-level information, such as billing address, account profile, etc.

The administrator(s) can add new users to the system by entering a name, email address, an initial password, and any other pertinent information. The company may require certain information be required in order to grant user status to an individual. An email can be sent to the new user welcoming the user to the system. The administrator can change user ids, or assume the identity of a particular user. Furthermore, the administrator can determine whether a group in the address book is accessible by specific users and view and modify all groups. However, the users designated by the administrator create groups and share the groups with other users as determined by the particular user.

For multiple users within an organization, the event creator user, or the system administrator, can limit the data accessible to other users within the organization. The event creator can specify that certain other users can access data relevant to the event. Each user may have his/her own address book with contacts.

In the sales scenario, each sales person may only be able to see his/her own contacts and invitees, but the user may be able to see all invitees.

The administrator can create new users that have access to only one event. The access can be set to expire after a fixed period after event completion.

Within an organization, the administrator can also allocate a quota of events to users with event creation permission. When the user reaches the quota, they can be alerted to that status. Across organizations, an administrator can draw from a pool of users and events and assign them to any particular organization for which that user has administrative authority.

Individual users can create and manage their own events. The creation and management of events may optionally be controlled by authorization from an administrator. Events can be denoted as shared with others, as well as with permissions limited to invite more people and registering those people. The other users may optionally be limited to viewing only their invited attendees. The administrator can set various permissions for users, allowing access to specific functionality or views as set forth by the permissions granted.

The system of the present invention may be useful in event planning for education and training, among various other events. A curriculum composing a series of courses may be created, each course optionally having credits associated therewith. The course may be make a part of multiple curricula. Attendance and completion of each course may be tracked using the present invention.

Certification requiring the student/registrant to take, for example, 4 out of 5 courses can be enabled. The courses and/or credits a student has taken over a defined period of time can be tracked. Such information can be used to track the maintenance of certification. Automated reminder can be sent to a student to take courses or warn the student registrant that a certification is about to lapse, etc.

The student attendee can view all the courses taken for a particular curriculum, and what courses remain to be completed in that curriculum. The pre-requisites can be defined for each course and each course can have multiple pre-requisites. Automated enforcement of pre-requisites can be set up so that a registrant can not register for a course unless records indicate that the student has taken the pre-requisite courses. Alternatively, the student can be notified that s/he lacks the pre-requisite courses and the registration left up to the student. Each course can have a charge associated therewith.

A course/event can be created that is given in several different locations and/or times. The span of time can be very long, such as once or twice per quarter, or relatively short, such as each month. Grades can be tracked and/or issued. Further, a reminder email can automatically be sent to a student to take the next course in the curriculum.

Reports

As previously discussed, the user/event planner may receive various reports regarding the events. Reports provide a quick, functional, well-organized summary of the event's status on the event summary page. If desired, the user can focus in on specific parts of the event attendance and registration information. The user can view lists of attendees to each activity, be it a primary participant or guest, group lists, or meals. Furthermore, the user can view responses to any questions posed on the registration page.

As an example, the user can generate a list of participants/attendees to each activity to provide to the event staff at each activity location, so the event staff know who is coming and only allow entrance to those registered. For instance, at a seminar or training event, the event staff may be at the door checking off a list of participants. The reports may be exported at the user's discretion. For example, a report may be emailed, or otherwise forwarded, to a planning consultant or caterer.

As another example, a participant/attendee list may be utilized by the user to further market a particular event and increase attendance. For instance, many seminars and training events present opportunities for participants to network and generate leads. Thus, the user may use the list of participants to gain further interest and participation in the event.

The event summary page can display the event data, time, location, and status of participants/registrants. A link to a reporting area to generate more detailed reports can also be provided. A summary of response rate of participants including the number of invitations sent, number of responses received broken down by accepted, rejected, maybe, promotional codes, etc. may be viewed.

Tables may be separated according to attendance numbers for activities, groups, meals, etc. Each table may include the number of people signed up and revenue for each activity, group, meal, etc. Each activity or group may be clickable, showing the details of the activity, group, meal, etc. when activated. The detail page can show the list of attendees for each activity or group, including last name, first name, email address, number of attendees requested, amount paid, transaction number, confirmation number, etc.

As further examples of what detail pages may display, for meals, the page can show a list of attendees with last name, first name, email address, amount paid, available courses in each column with the choices for each attendee listed under the corresponding column. A questions detail page for viewing responses to questions may include a list of all the questions that were asked by the user. The user can click on a question to view the response. Also included on the page may be a list of those participants that responded to the questions and their responses. Answers to multiple questions can also be indicated by check boxes next to each question. The responses area may include last name, first name, email address, etc.

As another example, the user can click on an individual participant's name to view the participant's responses to all questions for that particular event. A back button to return to previous levels can be provided, as well as a tool bar with shortcuts. Furthermore, the user will have the option of generating from the detail pages a formatted, printable page. For example, the user may click a generate report button that will format the detail page and print a report. Various formatting options may also be provided allowing the user to choose a desired format or emphasize certain items in the report. In addition, the detailed report pages may include an export link allowing the user to export the current display view of the details.

As previously discussed, participants may also be able to generate reports. A participant can view a summary of the events in which the participant enrolled. A report including activities, groups, meals the participant has signed up for on a specific event, answers to specific questions asked by the user, guests the participant has enrolled for activities, etc. may be generated. The report may further include how much the participant paid for various events and what each of the activities, groups, meals, etc. cost. The report may also outline the amount paid, the confirmation, the date of payment, etc.

Another example of a report a user may generate is a revenue summary. The revenue summary indicates to the user how much revenue has been captured by the registrations. The user can additionally see how much the event planning services system charges the user for the transaction fees and exactly how much the user will receive after transaction fee assessment. The revenues can be broken down by each activity or bundle of activities.

A further example of a report a user may generate is an attendee summary. The user can view a list of attendees/participants for the event in order to determine who is coming to the event and for what each participant has signed up. In order to illustrate the importance of this type of reporting, a class reunion example is employed below.

In the example, the class of '90 is getting together for a reunion and there are multiple events going on at the same time, at all hours of the day. In order to keep each alumnus completely updated on where they are supposed to be at any one time, the organizer would lie to print out for each alumnus a schedule of the alumnus' activities for the weekend. Preferably, the schedule includes a list of activities to be attended and the time of these activities in chronological order. The meal choices of each alumnus may also be listed on the schedule.

The user should be able to view participant names and the status of the participant's response. The participant response can show the activity or bundle for which the participant has registered. The table can be sorted by header topics by clicking the header link. The details of each participant may be accessible on a separate page, the page outlining the name and contact information, a summary of activities, groups, meals choices, answers provided to any questions posed, payment, etc. Each page can be formatted and printed as previously disused. The complete list of participants and their information can be exported in a format allowing the list to be sorted by any column, such as Excel.

Yet another example of a report that can be generated by a user is an accommodations report. An accommodations report can reflect the latest status of hotel bookings the system has received from participants. The latest status in key categories set up by the user through an accommodations widget may be reflected.

Further included in the report may be the names of participants who have reserved accommodations via the event planning services system, any payment amount, confirmation number, and date if payment was made by participant. Changes made by participants may be highlighted and an indication of when the last changes were made and what the changes were may be displayed. A separate report may be generated by participants that made changes. Furthermore, each change may be time stamped for easy viewing. In addition, the user can sort for the latest set of changes since the last time the report was generated.

The report can be printable online so that the user can quickly obtain a usable copy, which can be faxed, scanned, etc. The report can be exported on an Excel document so that it can be sorted. The user can also generate the report at regular times. For example, the user may receive an accommodations report, or any of the other reports for that matter, on a weekly basis, a bi-weekly basis, etc.

By using an accommodations report, the user can be notified of the frequent changes that commonly occur to registration details, like hotel accommodation changes. The user can track the changes for specific participants and alert the hotel that the reservations have been changed.

In a typical scenario, the user might send out daily faxes to the hotel with which the user has reserved a block of hotel rooms. The fax might contain the latest list of reservations and highlight any changes from those who already have reservations. This often needs to be done on a periodic, perhaps daily, basis since participants are likely to call in and make changes at any time.

Utilizing the present invention, the user can generate reports automatically or on demand. The report can be directly faxed or emailed to a party at the direction of the user. Further, the user can print out the report and highlight or note any significant issues to their party, such as their contacts at the hotel.

The report may provide a list of participants along with the participant's reservations and choices, such as room type, smoking or non-smoking, etc. The amount paid, confirmation number, date of reservation, latest change to reservation, etc. can also be included in the report, as well as room availability status. The report can include changes made by specific participants, and each change can be denoted with the time and date of the change. The specific change made can be highlighted. Furthermore, the user can generate a report that includes only changes made since the last requested report.

A further example of a report that a user can generate is an event budget report. The event budget report assists the user in keeping track of the event budget and how much has been spent to date on the event. The user can enter how much is budgeted for specific items. New items can be added with custom headings and a budget can be inserted for new items. How much has been spent on each item may be entered. The costs by the event planning services system can also be factored into the budget.

Costs that may typically be included in a budget may include items such as registration fees, event creation fees, professional service fees, technical support costs incurred, etc. The user can view the current costs incurred on the system.

Profiling reports can also be generated by a user. Profiling reports allow a user to receive a report including details about attendees/participants. The report can include events attended by a participant, how much the participant paid for a particular event (if anything), what answers the participant provided to questions related to a particular event, what accommodations a participant requested for a particular event, meal choices, etc. The report can sort through a list of participants in revenue order.

FIG. 9 illustrates a sample attendee agenda in accordance with the present invention. As shown, the attendee name 126, event name 128, and event date 130, are listed at the top portion of the agenda. A table includes registration details 132, questions and answers of the attendee 134, and meal preferences 136. The registration details table 132 indicates the name of the event or activity 138 for which the attendee is registered, along with the date and time 140 of that event or activity, and the dollar amount 142 associated therewith.

The questions and answers table indicates a question 144 posed to the attendee, and the attendees answer 146 to that question. For example, one of the questions the attendee in the current example attendee agenda was asked was "what's your selling territory?" and answered "West Coast."

The meal preference table 136 includes the name of the meal 148, the meal selection 150, such as appetizer, entrée, and dessert, and the attendee's answer 152. In the present example, the attendee is scheduled to have dinner with the vice president of sales. The attendee here has chosen crab cake as an appetizer.

The report can also show when the latest contact from the user occurred and what medium the user utilized to make this contact with the participant, as well as the contact over time. Notes entered during contact with the participant may also be included in the report.

Often, participants to events provide donations. The report can indicate who much a participant donated and the date of the donation. A flag can be provided in the report to indicate participants exceeding a present threshold on donations over time.

The report can further indicate whether the participant is a member of a group to which the user belongs and when membership dues for that group are due. An address group may be created based on the results of the profiling report. A custom email may be sent to participants as a result of finding from the profile report.

The following example illustrates one instance of usability of the profiling report. An art dealer, who may be a user of the system, would like to know who has attended their show and whether an attendee has purchased anything at the show. The art dealer further wants to know how many invitations were sent out to a particular attendee before they attended the event, or agreed to attend, and whether the attendee bought anything at the particular event. If a purchase was not made, the art dealer wants to continue inviting this attendee to future events and track when the first purchase is made.

If purchases are made, the art dealer also wants to know how much was paid by individuals. The art dealer may send out special invitations to those who purchase the most or the most often. Special consideration or discounts may be given to those who attend frequently but have not made a purchase.

The profiling information is quite useful to the art dealer in order to allow the art dealer to target specific attendees, potential clients. As another example, the dealer may have a special collection of sculpture that the dealer wants to offer aficionados of fine sculpture. In this case, the dealer need to find all attendees of sculpture related shows and especially know who has purchased sculptures from the dealer in the past.

Furthermore, the dealer may find it invaluable to the show to know the special needs of particular attendees. For instance, special needs may include food preferences, handicap needs, and other such considerations that may require adjusting aspects of the show to meet these needs. The notation area to record any notes regarding contact with a particular attendee may be especially important to remind the dealer of the need for special arrangements. The fact that a particular attendee may like a particular style of painting or a particular artist may also be important.

Another example that may illustrate the usefulness of a profiling report is a political campaign. The ability to track individual contributors may be critical to the success of a campaign. Fundraising continues year-round for any candidate or incumbent. The fundraiser must be aware of who has been solicited, how much they have given, and who referred this particular contributor.

Moreover, the fundraiser needs to keep within legal limits of how much each contributor can give in a political campaign (for Federal positions). In this case, the fundraiser needs to know how often a particular contributor has donated funds, how much each donation was and how much they have given so far. If the amount is near maximum for that campaign, this particular contributor should be taken off the list for future solicitations.

Further, the fundraiser must be able to target separate groups of potential contributors easily. They must know who has not been solicited and be able to add these new people to the list for future events. In addition, they must not alienate the individual contributors, so the ability to spot the frequency of solicitation may be critical.

The contributions can come in the form of ticket purchases to events, actual donations, or donations in kind. Therefore, the ability to view all different types of financial transactions in a single report on a particular contributor may be imperative. In addition, the fundraiser must be able to add in additional items which may be donations in kind and be able to attach a financial value to that particular donation.

A report of a contact's history of event registration and attendance can also be generated. The report can be accessible from the address book function when searching for a particular contact name. A button to click through a report that outlines the details of each registration this contact has made to events can be included. The report can also include a component that outlines the actual attendance at these events.

Another report that can be generated indicates response results. The report can show, for an event or subset of events, the rate of registrations by various communication methods, such as email, postcard, letter, fax, etc. The user can also track the rate of response via the various options available, such as web (email versus open), live phone, mail, IVR, WAP, fax, etc. The user can also assess how many registrants used a medium other than that by which they were invited. For example, the registrant was invited via email but registered via fax.

Some key reports may include items such as the total number of invitations sent and the number and percent of total invitations sent via various vehicles, such as email, postcard, letter, fax etc. The total number of registrations and as a percentage of total invitations and the number and percentage of total registrations received via various vehicles, etc.

Actual attendance can also be tracked. The user can print a list of registrants, noting who actually attended the event, and enter the information. The user can enter the guest status area and mark the checkbox in the column "attendance" to record the registrants that attended the event. When the user clicks "update", the changes are applied to the database. The event report can indicate the column for actual attendance, and the profiling can show the attendance as well.

With respect to event-specific reports, a list of expense records can be reported. The list may include all the expense records entered by the user. The list can be displayed in tabular format, or any other format suitable for use with the present invention, such as pie format, etc. The total expense to date can be captured and each item in the list may be clickable, leading to the record itself. The user can filter against specific expense categories, such as listing only catering expenses, as well as listing all expenses. Each line on the list may include date, name, expense category, unit price quantity, gratuity, tax, total, etc. The user can set a date window. For example, catering expenses may be shown from Feb. 1, 2001 to Mar. 1, 2001. Similarly, this can all be done with respect to a list of revenue records as well.

A variance report may list all the expense categories applicable to a particular event. For each category, the report may show the budgeted amount, expenditure to date, the variance (i.e. expenditure to date less the budgeted amount), etc. The result may be totaled for all categories and displayed. Each category's expenditure to date can be clickable, leading to a list of expense records for the category.

A vendor expense report can filter expenditures on a vendor-by-vendor basis. This enables the user to quickly determine how much was spent on each vendor. A cost per attendee report can also be generated, which rolls up all the expenses and divides it by the total number of attendees. A return on investment (ROI) calculator can calculate the ROI with the click of a button. As previously discussed, a printable version is available for all reports.

Reporting across multiple events can be important for a user planning various events. The user any of the reports previously discussed and track expenditures across multiple events. The user can manually select the specific events, filter base on event categories, and/or set a time window, such as all the roadshow events that occurred in the year 2000. Each report may have a total for the set of event selected and an events list page, the event being automatically selected for the list page, and a rollup report being readily available.

A report can be generated by the user of deleted invitees. In other words, the report may list the participants whose registration status has been deleted by the user. The information in the report can include the participant name, company name, title, participant type, date of deletion, etc.

The user can run reports and/or search data and group a list of attendees utilizing a button, which may be labeled "Group Selected participants." A grid can have a check box for selecting the participants for grouping. This button may take the user to another page to group the selected participants. The new page may have options for grouping these participants to a new group or into an existing group and two buttons (Group and Cancel). Group may group them (back to the report home page) and Cancel may take back to the previous page.

A delta report can show the difference between the last time a user ran an report to the current time he/she generates an report. The report may show the difference in data between yesterday registrations and today's. This type of reporting may also be available in "Schedule Report" where the user can schedule a report that shows data from the last time the report was run. It is possible the event planner and report person merely want to see the difference in registration between day 1 p.m. and day 2 a.m. The user can see these type of numbers instead of generating the complete report if s/he wishes.

The idea is to provide Delta report for all the reports. The delta report is particularly relevant in the area of registration, communication, accommodation, travel, etc. Also, once the feature is implemented, it may be easier to implement across the reporting area, instead of adding a piece of it at late date.

Delta reports show the difference of data between yesterday and today. For instance, the user generated the registration summary report on Monday at 5 p.m. The next day (Tuesday) at 11 a.m., the user wants to know if there are any registrations between 5 p.m. on Monday and 11 a.m. on Tuesday. The delta report within registration may be able to give the user the result set. These types of reports may be generated by selecting a time which may indicate the data presented in the report. The idea is to allow the user to select a specific time which may generate the appropriate set of event data.

On each category of reports, the user can select the event data by choosing "All" or specify a date range. To show the difference, a third time option is added. The time is "Since last report" which covers the difference between yesterday and today. If the user wants to run report data more than 24 hours, they can use "specific time range". The user may select an event, a report, and the time range of the report before hitting the "generate" report button. For each report, the report may display the current day's date, and the range of time the report data covers.

The Report Home Page may have one more radio button labeled, for example, 'Since Last Report' along with the two existing buttons 'To Date' and 'Specific Date Range'. If the User Selects the 'Since Last Report' Option, the report may show data between the last time the user run the report using this option and the current time he/she generates the report. The report Generated time may be updated as soon as the user clicks on the 'generate report' button in the report home page irrespective of whether the report is displayed in the page or not.

Various reports and listings may be available, as previously discussed. Reports and listings may be available to the user, a registrant, a guest, a person with a particular role as designated by a system administrator, etc. Further examples of reports and listings may include a new account proceeds report, a transaction report, an overall billing statement for each account, a new client listing, a new account summary, a professional services report, an authorize account listing, and a record of professional services.

New account proceeds is a detailed report listing an organization's events and/or activities, the participants, their quantity of purchase, dollar amount, and transaction status. The report can help to facilitate the supporting documents for billing. The transaction report may include a search for "event planner ID." The overall billing statement can consolidate both transactional charges, such as tickets sold, handling fee, etc., and pro service charges, such as training, consulting fee, phone, registration, etc. into one report. The new client listing reports a list of all clients, event planner ID, plan expiration date, number of events remaining and account type. This listing can help to facilitate an easier search for a specific organization in other reports.

The new account summary is a high level report that shows all events and/or activities available in a particular organization, dollar amount associated with the event/activity and the total number of tickets purchased. The professional services report shows the professional services done to a particular account. The authorize accounts function may include account status and the date created, and the record of professional services includes editable text.

Cross events reports can be generated. Cross events reports may provide event statistics that can be reviewed on an across events bases. The user can go to a report type in the reports section and generate a report that compares data and trends across events selected by the user.

Sub-organization reports can also be generated. These reports are generated across sub-organizations within an organization. The account administrator may need to be contacted by a user in order to access these reports if it is set up to be permission based.

Folders

The user can create folders for organizing objects, such as events, broadcast emails, surveys, etc. For example, an event planner/user may want to organize by marketing campaign. By placing items in a folder, the user can access them easily. The user can create a folder, man it, and put objects in it. Each type of object can have an icon associated with it that allows the user to easily identify the object. For instance, clicking on an event may lead to the event summary page. The user can also easily put all events, all surveys, all broadcast emails, and all action requests into the folder. Additionally, the user can put all objects into the folder easily. The folders can be copied or they can be deleted, without deleting the underlying objects.

Each folder may have an automated calendar feature that renders the date from each object. Canned reports may include an itemized RSVP summary, total unique contacts, contact details, and itemized budget tracking, for example. An itemized RSVP summary can include an itemized list of objects, where for each object total invitations or outbound communications, total responses, total yes, no maybe, "no response" responses, totals by contact method (i.e. email, letter, fax, postcard) are displayed. Each object can be clicked for additional details with respect thereto. Further, for each object that has a budget, actual expense, or variance, the objects may be listed along with these items and a total may be displayed for all objects.

Surveys and Polls

In order to gather information from attendees/participants, the user can survey or poll these participants for information. The survey/poll page can be a variant of the registration page that contains only contact information and Q&As. The survey widget can be similar to the registration setup. The user can customize the contact information and the Q&A and insert arbitrary heading text to provide description or to divide the survey into sections, for example. The survey may contain a URL, which may be in a customized email with a personalized link to the survey as one example. The user could also put a jump page in the survey email, the jump page having a salutation of some sort or instructions, etc. Various options are available for creating the survey, such as sending the survey with or without email, creating a group in the address book to receive a survey, copying a previous survey to build a new survey, presenting a page thanking the respondent for completing the survey following submission thereof, etc.

A survey report may contain a plethora of survey results. For example, the user can view the total number of invitations, respondents, etc. Further, the user can see the total responses for each questions, a summary of how many answered what question choices, a percentage breakdown for the choices, the total responses, a link to a list of all the answers, etc.

Questions posed to the potential participant can have various answer forms possible at the discretion of the user. The participant may click a radio button/one choice or choose all that apply. In order to provide the participant with more choices or input, a rating scale (e.g. 1 to 10) may be used, or an open-ended/single line or open-ended/multi-line response option may be used. A progress meter may be included on the registration page, such as at the top of each page, to indicate to the registrant where s/he is in the registration flow. By this feature, the registrant can determine where in the flow s/he is and how much longer or how many more steps or pages are required for completion.

The user can also find out why an invitee has declined to come to an event utilizing a poll. The resulting information can be in a manageable format, such that a Pareto analysis, for example, an be done to improve future events. The user can customize this poll by leveraging the survey/poll feature. When the invitee/participant declines the invitation, he or she is brought to the survey created by the user and he or she is asked to complete the survey. The user has easy access to the summary information, such as how many and what percentage said what, and for each participant, a record of that participant's answers.

The user can convey a message to those invitees who declined the event. An event decline page may be set-up. The user can have an area, such as in advanced options, to enter custom text, including HTML tags. This text can then appear on the event decline page.

As previously discussed, the user can create a multiple choice survey questions with more than one choice capable of being selected. The user can also include an option accompanied by a blank textbox, such as an "other, please specify" option. The reporting can reflect all choices selected, including this additional option.

Communications

As previously discussed, the user can create a broadcast email. The user can select a set of events to insert into the email, and when the user inserts the event, a description for the event will show up on the email. The user can set up an invitee list associated with the email that applies to all the events in the email. At some point, such as when the user sends the email, the invitees can be associated with each event in the email.

An attendee may lose his confirmation email and requires another copy, to be emailed, mailed, faxed, etc. The participant can contact the user directly and have the user manually resent the confirmation email, etc. The user can do this easily, such as via the guest details page.

The user may need to cancel the event. The user can accomplish notification to the attendees in a number of ways. One approach may be to build a list of attendees, no responses, and declines, and send a broadcast email. This can be done easily, such as in a single click. Additionally, if the user changes the event page or registration at any point after the event page is activated, the user can easily obtain a list of attendees, no responses, and declines at that point in time and communicate to the lists of people.

For public event with no invitations, the event page may not be forwarded to an invitee/participant. Rather, it may be displayed on a website. For such public event announcements, changes to or cancellations of the event can be communicated to the public by noting the cancellation or change on the publicly accessible event page. Further, broadcast emails can still be sent to attendees, no responses, invitees, declines, etc. to notify them of the change or cancellation.

The users can create customized greeting cards and forward them to invitees, using an integration process. The user can enter an event creation flow and set up the invitee list. The user can then go to advanced options and select "mail or fax invitations" and then choose the card option. A page containing categories of cards is served up and the user can choose an image. The company hosting the greeting card site receives the invitee list with addresses and event data to be included on the card. The user customizes the flow by scheduling the delivery, changing the recipient list, customizing the content, etc. and continues where a cost summary for the cards is presented to the user. The user can approve the cost and will receive a confirmation that the cards were forwarded to the invitees on the list provided.

The user can send invitations to the invitee such that the invitee can view the invitation on a personal digital assistant (PDA). Furthermore, the event planner/user can use a PDA to check-in pre-registered attendees when the user is at the event. The user can see the attendance summary, drill-down to see if a particular attendee has checked-in, etc. The user can also register someone onsite.

The attendee may check in him/herself when s/he arrives at the event site. The attendee can also beam business card information and have the data captured in the database. The attendee can register onsite, or from anywhere for that matter, for the event.

The user may forward invitations for the created event via wireless methods. For example, using a WAP-enabled phone (wireless application protocol), the participant can receive invitations and reminders, and RSVP for the event from any location. The user can easily check on RSVP summary and guest status via WAP phones as well.

The user can select the option to send the invitation to a participant via WAP and send the invitation accordingly. Upon selection, the user can be advised whether the particular event is suitable for WAP communication. For example, the capability works best for relatively simple events, rather than multi-track registration events, and the user may be so advised.

Questions for the participant may be included in the invitation. Reminders can also be scheduled, and the user can choose to send a reminder via WAP, or any other method suitable for use with the present invention. Short broadcast emails may also be ideal for sending via WAP. Other examples of items that may be sent via WAP are save the day letters and thank you notes, to name a few.

As an example of use, upon receipt of an invitation via a WAP phone, the participant may be able to navigate through and RSVP yes, no, or maybe. The participant may also answer any questions posed. Further, the participant may later receive reminders and short broadcast email via the WAP phone.

Event Page and Registration Page Changes

Once an event has been activated, a user may want to change the event or registration page. The user can change items such as a header image and/or the user can move activities, groups, meals, Q&As, etc. Further, any activity, group, or meal, for example, can be deleted where reservations have already been made.

Various forms of customization of event and registration pages can be provided. The event page can allow the user to add images and formatted text anywhere, change registration buttons into links, maintain personalization of invitation emails, use multiple pages, etc. For example, an event can include separate pages for accommodation details, agenda, speaker information, local interests, registration, etc.

The user may perform various modifications and/or additions to the registration page as well to achieve customization. The user can change the placement of elements, such as activities, groups, meals, Q&A, etc. The registration may be split into multiple pages. For instance, contact information, event registration, Q&A, etc. may all be located on separate pages. Images and formatted text can be added. Background colors may be changed, etc. Further, the registration page, as previously discussed, can be modified after the event has been launched, including deleting activities, groups, meals, etc.

Conflicting Activities

Concurrent conflicting activities for an event may be handled in various manners. One way is to use mutually exclusive activities in a group, allowing the registrant/participant to choose only one activity within the group. Another way is to identify on the registration page, next to the items that conflict, any conflicts in the schedule when the participant submits the registration. When the participant sees the conflict, the participant can register regardless of the conflict, or re-do the registration.

Roles

When an organization runs multiple events simultaneously, the role of the people that are invited to the event can change from event to event. For example, John Smith may be a speaker for one event and then a staff member in another event and a regular attendee in a third event, and so on. The address book allows for the formation of infinite numbers of groups. In order to associate a group or attendee with a particular event for better management, attendee roles can be implemented.

Attendee roles allow a user to associate an attendee with a particular role for a particular event. These roles can appear in the address book if the user wishes, but more importantly, they can appear in an event context. In this way, the address book does not have to be cluttered with large number of groups. The event attendee role persists within the database so that reports may be run against these roles across events.

The user can access predefined attendee roles, such as speaker, VIP, vendor, staff, executives, planner, etc. In an event context, the user can associate people from an address book or address book group with a particular group. The screen can allow the user to pull up the entire address book or a particular address book group and then check off the people the user wishes to associate in particular role for the particular event. In addition to the predefined roles, the user can create user defined event attendee roles.

Once the event roles have been associated with people, the user can send communication to these event groups either to the entire group or to address a particular person within that group. For example, the user can pull up the event role and the list of people can be displayed. The user can check off the people within that group of check off the entire group to whom the user wishes to communicate with in an email blast.

The user can also obtain reports on these roles. For example, the user can run a report that shows the RSVP results for the VIP role or the speaker role. In addition, the user can view the response rate for the VIP role across multiple events and/or view the list of all VIPs for all events, etc.

Campaigns and Recruiting

The attendee role can be utilized to allow the user to create different pricing and activities for the different roles. For example, the user can create a special price for a VIP that is free. The user can also create a special activity that only VIPs, for example, have displayed during their registration process.

As previously discussed, the user may send out different emails and display different event pages to different audiences. The reason for the different forms of communication may be to increase attendance to the event. For example, the user may wish to set up one event page for existing customers and another event page for prospective customers. The user can then view the response rates to compare between the different event pages, etc.

In addition, the user may send out a special email to all respondents who declined to come to the event, as previously discussed. The email can offer those who declined to come to the event a special promotional price. The user can again view the response rate from this particular activity.

The user can also measure the rate at which the invitees are visiting the site and compare that to the number of respondents. In this way, the user can determine how effective the user is in eliciting a response to the invitation. The user can then determine who has visited the event page, but has not responded. The user can do a special communication reminder to these people. The report can show all the different "campaigns" the user employed and how effective each campaign was in recruiting attendees. For every communication, the user can designate a communication as a particular campaign and measure the result of the campaign in the number of visits to the site, the number of respondents based on the campaign, etc.

The user may also want to create a page to capture leads. The user can create such a page easily, such as a page similar to the event page, and attach a survey, etc. This page may also include a URL to direct the user to other sites, etc.

An "invite a friend" function can also be included. It may, for example, be a link on an invitation mail, the confirmation page, the confirmation email, etc. This provides increased personalization for the friend and may help to increase the attendee rate.

An invite more people link can be presented to the attendee on, for example, the event page, invitation email, confirmation page, or confirmation email. A popup window may appear, for example. Such a popup window may include fields to enter information, such as the secondary invitee information, primary invitee information, etc. This feature allows for greater personalization in the invitation email. The primary invitee can type in a personal invitation to the secondary invitee to appear in the forwarded message.

The information of the secondary invitees is captured and the secondary invitees can be listed within the participant status area. Viral marketing results can be captured through this feature. For example, a sales manager can see which of his/her reps had the highest response rates from prospects, who their top leader generator is, etc.

An inviter column can indicate to the user if the participant is a primary invitee, secondary invitee, etc. For example, "event planner" may appear in the column indicating that the person is a primary invitee was invited by the user. The inviter's name can appear, such as "John Do" indicating that the person is a secondary invitee that received the invitation from John Do. "Open" may also appear meaning that the registrant was not invited but came through an open ID.

When a user sets up an invitation for an event, the user may also be planning how to send follow up communications to his/her audience. For example, if someone accepts the invitation and decides to go, that person's confirmation may need to be different that someone who declines for an event. Someone who accepts an invitation may need additional forms along with the confirmation to the event and its sessions. Likewise, a regret email is another place where the user can address the audience and maybe "hook" the user in with another message. A function of the regret email may be to confirm that the user is not going and to give the user another opportunity to reach out to his audience.

The user has created the event and sets up the invitees and sends the invitations. Regret emails can automatically be sent when the invitee declines the invitation. The regret email can be customized. The campaign management filter may provide results of the regret emails to the user. Confirmation of the regret email can also be set up. Further, if a participant exists in more than one regret email, and that participant declines the invitation, the user may choose to have only the first created regret email sent to the participant.

Attendee Organization

In large complicated events, the ability for the user to organize attendees is important. Such organization can include items such as determining who should be sitting at which table during a meal. Other examples include organizing golf foursomes, assigning roommates for hotel rooms, etc. The user can utilize the attendee organizer to organize items, such as those mentioned above, within the event.

The user can manually enter assignments or they can be randomly generated. The randomly generated assignments can include parameters for assignment. For example, the user can decide that each table should include one executive from the company. The user can manually assign other attendees, such as the president, VIPs, etc. or set forth additional parameters for assigning attendees. The user can randomly assign the remaining attendees to the remaining spaces at the tables or manually assign.

After creating an activity to be organized, the user can select people to be organized, either for a particular activity or the entire list of attendees. The user can determine the number of people within a subgroup, such as four people for golf, two people for hotel room, ten people for dinner table, etc., and determine the number of subgroups available. People can be manually assigned to particular subgroups, or criteria may be chosen for selecting people to perform subgroup assignments. For example, a user may know that company policy requires that people of the same sex are roommates. The user can then select a list of males and perform subgroup assignments. The user can then pick out a list of females and perform randomly generated assignment. A report can indicate to the user lists of people and the manner in which they are organized.

The user can automatically communicate to attendees their assignments in an email, etc. Further, the user has the option of communicating to the person the names of the other people in the subgroup.

Action/Task Request

Event planners/users often need to work with other members of an organization to plan and execute an event. Thus, an efficient way to assign tasks and communicate status, within the context of a specific event, can save time and enhance control for the event planner.

Figure 10:
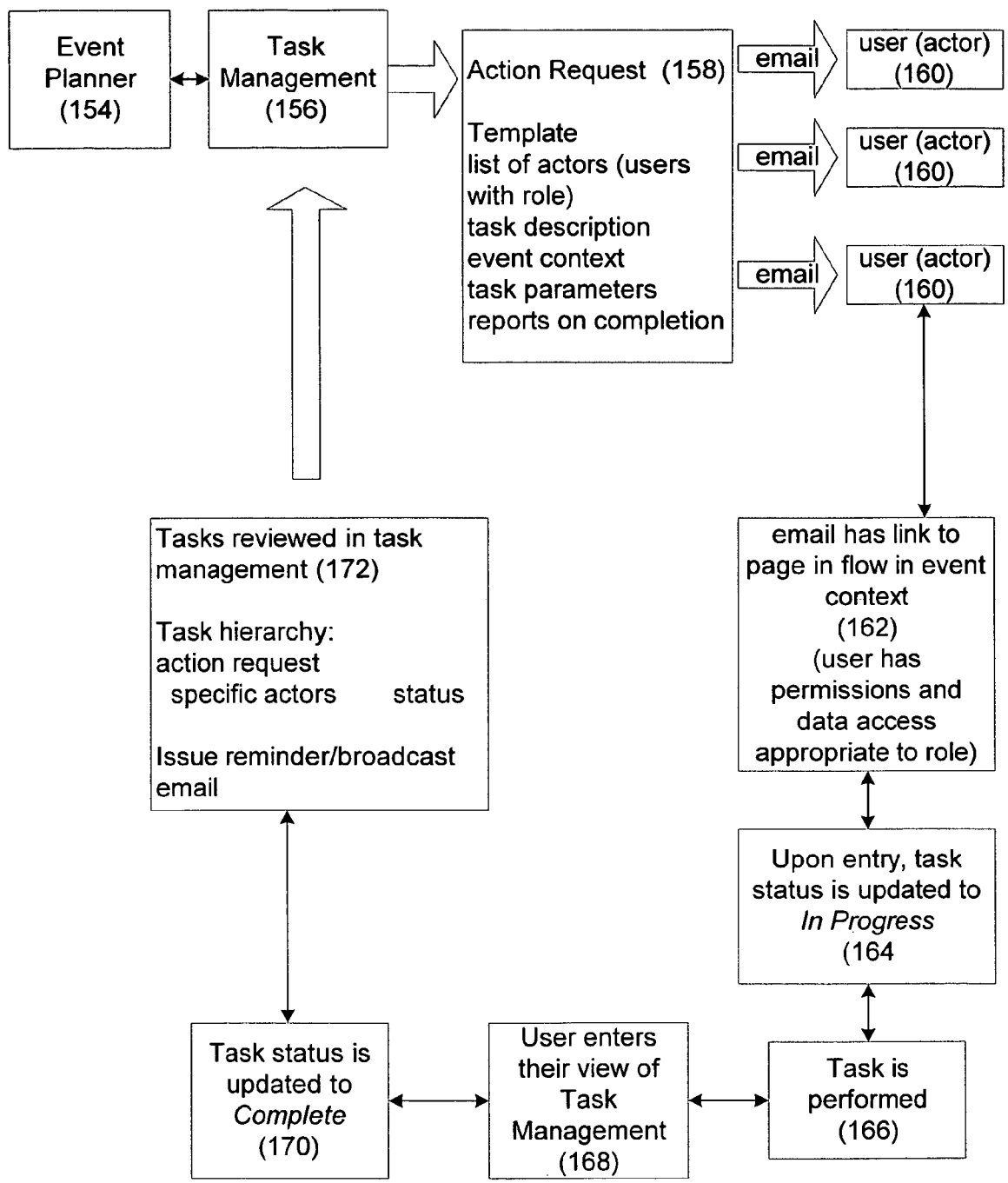
FIG. 10 is a flowchart illustrating a collaboration flow process in accordance with the present invention.

FIG. 10 is a flowchart illustrating a collaboration flow process in accordance with the present invention. The user/event planner 154 enters the task management page 156 and generates an action request 158. The action request 158 is forwarded to one or more actors 160 to follow through with the instructions relating to the request 158. The user/actor(s) 160 opens the email link to a page in the flow in the event context 162 and the task status changes to "in progress" 164 upon the actor's entry onto the page. The actor 160 performs the task 166. The user/actor 160 enters his/her view of task management 168 and the task status changes to "complete" 170. The tasks are reviewed in task management 172 and the task management page 156 is updated.

Task management is a top level summary for every task, showing the total number of actors. This may include the number per status, and the percentage of tasks completed. A list of actors, including role, task description, event context, task parameters, reports on completion, etc. can be included in task management. The grid can be filtered either by event or task name.

Task detail provides a way of interacting with the currently selected actors, for a specific task, who can be searched for by name or filtered by completion status. The actor/user may have permissions and data access appropriate to a defined role. A task hierarchy is indicated 172. Further, reminder/broadcast emails can be forwarded to user/actors to remind them of the action requested.

The user can have sales representatives issue invitations to their customers. In order to communicate with sales representatives in the organization to provide event details and monitor compliance with the request to forward invitations, the user can navigate to an action request function. The user can select sales invitations from the list of available templates, which can include a general request template. The user is presented with a list of all other users with the role sales representative. The user can then select those who should issue invitations, and can enter some text explaining the request. Default text can be provided for this template. The user selects the event to set the context and set a deadline. When the user hits send, an email is sent to each person on the list which gives a short explanation of the request and includes a link to the event planning service website. The request is added to a request history. When the user selects the request, the user is taken to a screen that lists all of the participants and the status of the request for each person on the list, such as pending review, in progress, completed, etc. Reminders can be issued if requests are not completed.

When the sales representative receives the request, s/he can click on the link in the email and is forwarded to the login page at the event planning services website when s/he does so. Upon login, the sales person is placed in a screen appropriate to the context of the request, such as the guest page for the event. The action request is queued in their personal list of requests and they can view their own address book, and any guests they have invited. The sales person can review the event page and register their own guests. The sales person can customize invitation emails for the people they invite. The first time the sales person responds to the link, the status on the request changes to "in progress." The status of "completed" can automatically be updated to that status or manually updated by the sales person.

The action request function has various other uses. As an example, the vice president of marketing wishes that all marketing staff that attend an event report back on their contact with customers. The VP enters the event planning site and navigates to the action request function, where s/he selects the contact feedback template. The VP is presented with a list of all users with the role customer contact and selects those who will be attending the event. The VP selects the event for context and appends with a little encouragement to the default text. The VP can monitor compliance in the request history.

The respondent receives the request in an email and clicks on the link. Once the respondent, customer contact person, logs in, the person is forwarded to the context, which in this case would be the guest status page for the event. The respondent can select the contacts the person met at the event on this page and enter notes. Once the person has entered this information, the status for the request will update to completed.

The action request can also be utilized to request that someone performs a task. The user/event planner, or any user who has permission to issue a request, may want to request that the person with the reporting role prints out the list of attendees and forwards it to the florist so corsages can be made for each attendee, for instance. In order to make this request, the user enters the action request function and selects the generic template. The user is presented with a list of roles from which to select, to populate the list of users, or can select from all users. Users in this context are non-event planner users. Once the event planner/user chooses a particular user from the list, s/he can set the event context, or not. The request is entered in text format and added to the request history for monitoring.

When the respondent user gets the email, s/he clicks on it to be transferred to the event planning site. The respondent is brought to the event summary page if the user/event planner set the context. Otherwise, the respondent will enter on a main page, such as the home page of the event planning site. The respondent can perform the task requested and update the status to completed when finished.

As previously discussed, an event can have a plethora of tasks associated therewith. A task list can be generated detailing the tasks and having checkboxes to mark the status of the task. The task description may appear next to the task name. For example, the task of "get speaker data" may include a description of taking speaker bios, abstracts, etc., with further details available about the task by clicking on the task name. A master task list can be developed and utilized to generate tasks associated with particular events. Both task lists can be edited to add or delete tasks and/or information associated with the tasks. The total number of tasks assigned to an actor can also be displayed.

Workflows may allow invitations to be sent out to select participants, and for them to interactively report on their progress with mechanisms parallel to those in current use for event registration. The user may want to create, manage, or obtain reports on a collaboration task, within some existing event. A collaboration task is essentially a formal communications process whereby the EP can delegate tasks to certain actors, and track progress towards their completion. Examples of collaboration tasks, to name a few, are free format, sales invitation, staff follow-up, and speaker request. The latter three are 'interactive' in the sense that the actors assigned to work on them receive Email notification of their assignments. And this notification may include a link enabling the actor to return to a task detail page where they may be able to report on their progress—in a workflow similar to that for registration.

Collaboration tasks may progress through a sequence of states. The particular state is reported to the user as the task's status. Though the specifics of task creation, assignee interaction and consequent updates vary according to the type of task, the sequence of task states may be common to all task types. Post conditions associated with tasks may include the following scenarios: the task is created but unassigned; the task has been assigned, but no response; the task has been accepted and is in progress; the task has been completed; and the task has become overdue.

Much of the workflow may be common to all four types of collaboration tasks. The user may press on Create Task. In a create task area, the user can fill in a number of attributes such as the task type, its name, a description, and whether or not it has a due date and time. There may also be a priority, and a category—for reporting purposes. Then, depending on the task type, there may be additional attributes. In the case of 'Sales Invitations', for example, there would be a number of people to invite. The user can specify the 'event context'. The user can also assign other users, invitees, and/or registrants as 'task actors'.

A means of reordering the list of speakers may exist. A speaker page may present a grid of all the featured speakers. It may be possible to click on any of these speakers and be taken to an edit speaker page. This may become a variation of a "my task detail" page to which speaker request collaboration task actors may return to report on their progress. This page can provide support for their image and document uploads.

Furthermore, a speaker page may display the speakers name and other biographical details. A popup link for viewing an abstract of the talk to be given and a photograph of the speaker, etc. may be presented.

Broadcast email may be sent to a set of selected actors. Further, the sales invitation workflow can include importing new participants into the set of participants for the (parent) event. For each participant, a customized "form" field and a "personalized note" can be associated, and then mail-merged at the time the invitations are sent out. The imported participants can be distinguished in such a way that they can subsequently be managed in accordance with roles, such as of the original salesperson who imported (or nominated) them, or of the event planner/user making a final determination of who should actually receive invitations to the event.

Activity Waitlist

The user can specify that an activity has a waitlist, along with a capacity of the waitlist, should the user desire such a waitlist capacity feature. When a registrant attempts to register for a filled activity, the registrant can be notified that the activity is full, and they can be placed on a waitlist. If the registrant chooses to be placed on the waitlist, the registrant may not be charged until the registrant actually gets a place in the activity.

The user can monitor the length and the roster of the waitlist. If people cancel from the activity, or if the user adds capacity, the first person on the waitlist can receive an email notification that space is available, with a link to the registration page. The user can set it up so that if the wait listed person fails to respond to the email that space has become available in x days, or if they decline, the space is offered to the next person on the waitlist. When the waitlist is closed, those remaining on the waitlist can be so notified.

When the waitlisted person receives notification that an activity is open and clicks on the link in the email, the person may be presented with a list of the waitlists the person s on, with an indication of which activities are now open. By clicking on a particular list, the waitlisted person can register for that particular activity. If, by registering for that activity, the person will be de-registered from another activity, such as where the activities are mutually exclusive, the person can first be provided with a warning. The waitlist display can also show the waitlists that are expired or closed.

Evaluation of Event Page Efficacy

On the event summary page, a grid can display the number of invitees that clicked through the event page but have not yet registered, along with the total number of page views for that page. These numbers could be higher than the actual number of invitees since the same person might return several times prior to deciding to register, but it will provide the user with a rough estimate of the number of people that have at least viewed the event materials. If that number is much higher than the number of registrants, the user may decide to reevaluate the messaging on the event page, etc.

Data Integration

Sometimes, an event planner needs to integrate a large quantity of information with the information utilized on the event planning site. For example, an event planner organization may be utilizing a customer relationship management (CRM) system, which contains leads collected by marketing, sales contacts, and customer service incidents, all organized by company. The user would like to automate an event(s), with the appropriate integration with their CRM.

In a typical scenario, the user can access contacts stored in the CRM to create an invitation list for the event. Within the CRM, the user can create a query that can pull up all contacts that match certain criteria, such as location, prior purchases, expressed interest, etc. The user can send the collection to the event planning services site to populate the invitee list or mark it as an invitee group, so they can pull the list from the event planning services site. The event is created and invitations sent, the invitations sent using either the event planning site's email engine, or the email engine of the CRM, depending on where the user/event planner wishes to store his/her communication history with his/her customers. As invitees register, some day may be forwarded to the CRM. After the event, actual attendance data can also be sent to the CRM.

In another scenario, the user sets up an open event using the online tools at the event planning site. The event is promoted and people register online. The contacts can be sent to the CRM for follow up as potential leads. The level of integration across these scenarios can vary from simple import and exports to seamless database access. The online booking system (OBS) is another form of integration. The OBS may allow a participant to make travel arrangements.

At customer requests, data can be integrated with finance or accounting packages. The event planning services may transfer data back and forth with specific packages, such as in periodic batches. The event planning services may be the source as well as the recipient of such batch transfers.

Categories

The user can set up various parameters at the organization or sub-organization level. The ability to do this set up can be made to be permission-based. As an example, the user can create a set of expense categories for tracking purposes. As the user creates an expense record, s/he can enter the expense category for this item and track against it. Expense categories may include, for example, catering, accommodations, logistics, etc.

The user can also create revenue categories, such as ticketing, accommodation, etc. Vendor records can also be created. The user can create a list of vendors with which s/he works. As the user creates an expense record, s/he can enter the vendor into the record and track against it. Each vendor record may include vendor named, vendor type, address, phone number, email, contact person, etc.

The user can input various parameters for each event as required. The user can, for example, enter a budget for the given event. The budget can be entered based on expense categories. For example, for a given event, the user can enter budgets such as a catering budget, an accommodations budget, a logistics budget, etc. The total budget may be available automatically. Further, the budget can be changed at anytime. A user can add, modify, or delete budget items. As previously discussed, at an organization level, the system administrator can make the addition, modification, or deletion of these budget items permission-based.

The user can enter the revenue for a given event. The revenue can be based on categories. For example, for a given event, the user can enter revenues such as catering revenue, accommodation revenue, logistics revenue, etc. The total revenue, the summation of individual revenue streams, may be available automatically. The user can change the budget anytime, but as discussed above, it may be permission based in the case of a system administrator type scenario. A record event planning services expenses can be created and updated automatically, such as transactions are completed, or as a daily batch job, etc.

Items that may have categories include events, contacts, communications, such as email, fax, postcard, survey, etc, and activities. The user may change the category of an item at any time. For event categories, default categories may be assigned, such as unassigned, roadshow, customer seminar, conference, sales seminar, training, and meeting. Themes may also be provided. The user can set/modify the category of the event within an event summary area. In an area for managing an event, the user can filter for a specific category of events. The user can do rollup event reports based on a category of events. Some examples are: for the roadshow category, provide RSVP statistics (25 roadshows, 10000 total invitees, 1600 attendees, etc.); for roadshow category, show total revenue, expenditure budget; for roadshow category, breakdown by specific expense, budget, revenue categories; for contact categories (Track as Address book enhancements), etc. The user can add/modify/delete types of categories. Each type of category may also contain a set of categories that the user can also add/modify/delete.

An example type may be a position, and it may contain, as a further example, executive, director, and/or manager categories. This may enable the user to easily do a query such as "give me all the contacts who are executives in marketing at a Fortune 500 company in the software industry." The following are examples of types of categories that might be provided: contact position—default categories may include executive, director, manager, staff, admin; function—marketing, sales, operations, engineering, customer service; company size—default categories may include Fortune 500, large, medium, small; industry type—default categories may include aerospace, automotive, banking, consumer goods, electronics, professional services, software, telecommunication, government, and education.

The user may import a spreadsheet of contacts that is pre-populated with types of category and categories. Further, the user can set the category for each contact in a contact record. The user can set-up "smart Q&As" that match category types defined by the user. If the user creates a survey or registration page including smart Q&As, each respondent's entry for the categories can automatically flow into the address book, and may be tracked separately if desired.

For communication example default categories for broadcasts may include: save the day, thank you, and follow-up. The user can report on communication readily. For activities, the user can define categories outside of the event context. The user can set an activity's category during the activity creation process. The user should be able to report against categories of activities. An example is "provide the total number of people who attended Tutorials last year."

User Interface

A conventional user interface for this may be provided as a dual grid. Alternatively, two grids may be shown. Preferably, one grid is above the other, with a pool of potential actors shown above and the set of currently selected actors shown below, or vice versa. Both grids can support conventional alphabetic filtering. The grid can also provide a filter on the pool of potential actors, along two dimensions.

Travel and Accommodations

The user can query the participant for travel information. With travel information of the participant, the user can plan for local travel logistics, such as scheduling limousine pickup/drop-off services. Reservation of airline tickets may also be arranged via a vendor.

A travel information widget, similar to the activity and group widgets in registration set-up, can be utilized to query the participant for travel information. Using the widget, the user can create a travel information page that queries the participant for arrival and departure information.

As another option, a travel information section may be added on the registration form. When the user desires, a broadcast email can be sent prompting the participants to provide travel information. The email may also provide a link for access to a travel information page. The participant can click on the link and fill out and submit the appropriate information on the travel information page. For example, the participant may enter airline, flight number, arrival/departure time, arrival/departure airport, number of travelers, names of travelers, special needs, such as dietary restrictions, wheelchair access, etc., etc. The participant can be provided with confirmation of the information entered and submitted. The travel information can be accessed by the user via reports, such as event summary and travel information reporting. The user can contact participants that have failed to respond to any emails inquiring about travel information should the user desire. An event travel summary report can be generated by the user detailing individual attendee travel details for the user.

A travel window may be provided. A travel window represents a span of time defined by the user. The user can prevent (or not allow) the registrant from specifying travel outside of the defined dates. As another option, the user can allow the registrant to travel outside of these dates. If the registrant travels outside of the dates, a report generated by the user may indicate the registrants that have requested travel outside of the dates.

Figure 11:
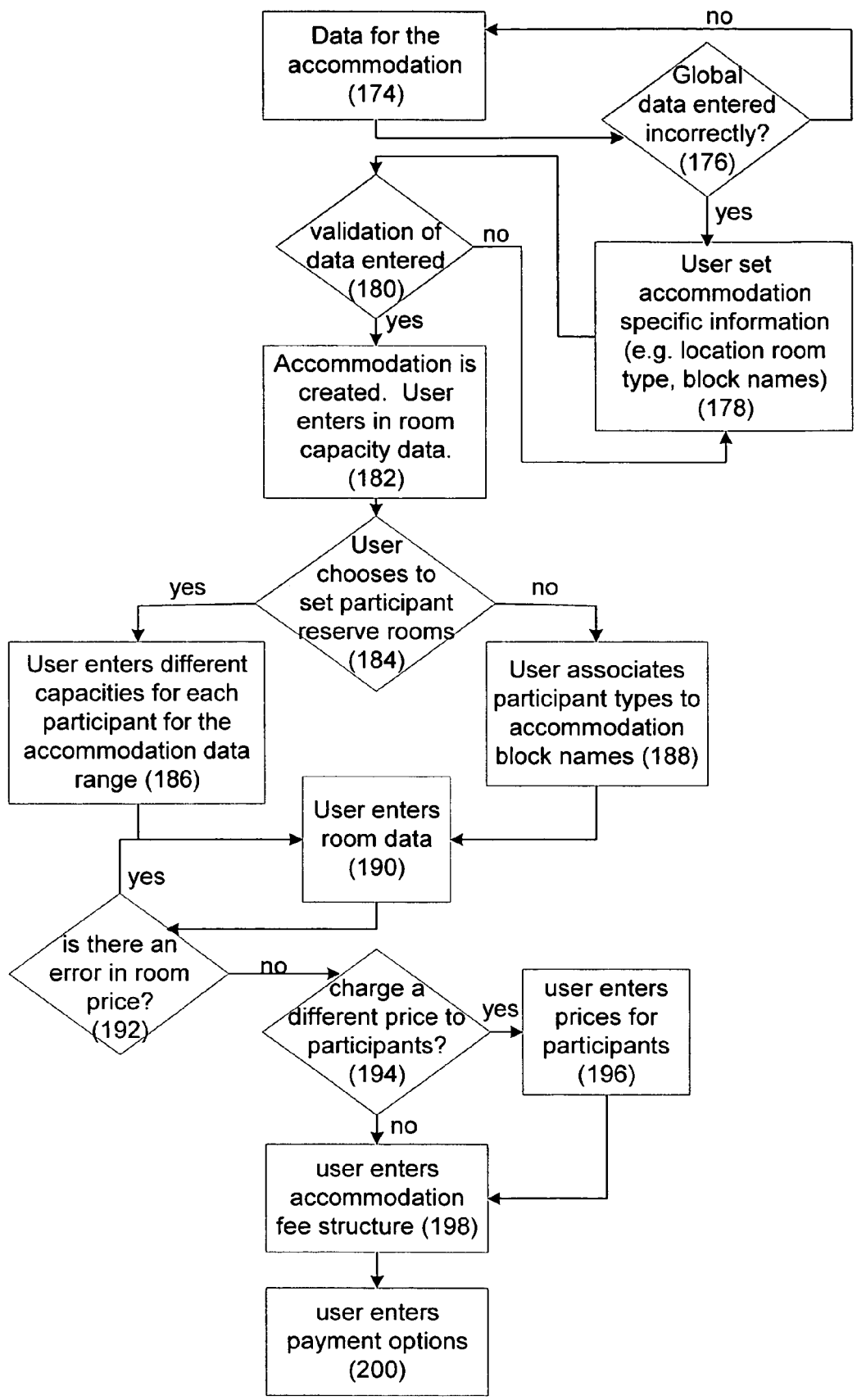
FIG. 11 is a flowchart illustrating a process for setting up accommodations in accordance with the present invention.

FIG. 11 is a flowchart illustrating a process for setting up accommodations in accordance with the present invention. Data for the accommodation may be entered 174. If the global data is entered correctly 176, the user sets accommodation specific information, such as location, room type, block names, etc. 178. If the global data entered 176 is incorrect, the user returns to entering data for the accommodation 174. A validation of the data entered occurs 180. If the data is not validated, the user again sets the accommodation specific information 178. However, if the information is validated 181, the accommodation is created, the user being able to enter room capacity data 182. The user then chooses to set participant reserve rooms 184. The user can enter different capacities for each participant for the accommodation date range 186 or associate participant types to accommodation block names 188. The user enters room data 190. Where there is an error in room price 192, the user enters the room data again 190. The user can choose to charge a different price to participants 194. The user can enter prices for participants 196 and/or enter an accommodation fee structure 198. The user can then enter payment options 200 to present to the participant.

The accommodations management area can provide the user with enough flexibility to store the necessary housing contract information in one place. By being able to enter in a number of variables like room blocks by day, prices by day, attrition clauses, inward and outward facing rates, etc. the user can exert control and ultimately optimize his business. By calculating figures from this area and automatically inputting them into the budget feature, the expense/revenue tracking is streamlined, helping the user to optimize his business.

The user can choose to display individual hotels on the registration form. This selection can also be changed by the user at any time during the registration period. The accommodations can be ordered by the user by number or by selecting "preview accommodation." Hotel details can be selected, such as check in & out dates, hotel description, hotel contact information, maximum number of rooms per registrant, block names and room types, hotel preferences, etc. The participant can be queried, such as by allowing the participant to check a box, select from a pull down menu, answer questions, respond to an email, etc., as to whether s/he has any special requirements. For example, the participant may be asked to check a box for roommate preference.

Hotel description information may include hotel name, a description of the hotel itself, address, map/directions option, hotel website URL, image upload, etc. The contact information for the hotel might include the name, email address, phone number, vendor category, etc. Block names and room types may require the block name to be entered, such as "poolside," "garden," "towers," etc. A room type may be associated with blocks using a textbox. Separate entries with commas or carriage returns can be submitted, for example. "Shared" room blocks may also be selected, so that multiple rooms are associated with one block name. A check box may be presented, the marking of the checkbox having the associated rooms pulled from one capacity. "Unshared" rooms can have individual capacities.

The room blocks can also be managed. The number of room blocks may be entered by night. The room capacities for participant types can be entered. For example, 100 king suites may be requested for the participant types VIPs and speakers. In this example, only VIPs and speakers have access to these room types and blocks. The user can assign room types to participant types while setting some capacities for that particular room type. The user can limit access by checking the appropriate boxes of the participant types that will have access to that room type. Further, the user can enter a number under the room night in order to reserve that number of rooms for that participant type. If no number is entered, the total number of rooms available for that night may be available on a first come, first serve basis for the participant types associated with it.

Room rates can be managed as well. The user can enter room rates associated with each room type per their housing contract. Separate room rates may be entered, even for shared blocks. The number of people allowed over double occupancy can be indicated, as may be the additional person fee per night over double occupancy. Room rates can be charged to participants as the negotiated rate, free, a different price from that negotiated, etc. The user can provide accommodations change policies, fees, surcharges, etc. Cancellation fee policies and surcharges can also be indicated. The user can provide payment options to the participant, such as the registrant pays at the hotel or the registrant pays as part of event registration. Credit card numbers for room guarantees can be made optional or mandatory by the user. Payment method options can also be provided, such as check, credit card, invoice, remittance address, registrant will pay for accommodation at the hotel, etc.

An accommodations policy page may be provided to allow the user to define reservation, change, and cancellation policies. Change or cancellation deadlines, fees, and surcharges can also be defined. Furthermore, a convenience fee policy can be defined, such as the convenience fee being paid from the proceeds of ticket sales, or passing the convenience fee to the attendee, etc. As with registration changes generally, the user can charge a surcharge to the registrant for changes or cancellations associated with accommodations. Further, the user can absorb the convenience fee charged to the user or pass it along to the participant for cancellations and changes. Thus, the convenience fees charged to the user can be absorbed or passed along to the participant and the user can additionally charge the participant a fixed or added fee for changes or cancellations.

An accommodation review screen may provide a summary of the accommodations selected by the participant. Event details, hotel details, and hotel contact information may be displayed, for example. A room block summary, negotiated room block summary, charged room rate summary, selected options, etc. may also be displayed on the review screen. For example, a poolside, single room for a "general" type participant at a charge of $100.00 for 2/16 and $100.00 for 2/17 may be displayed under the negotiated room rate summary.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A computer-implemented method for providing enterprise event marketing and management automation comprising the steps of:
   (a) providing a website including online tools for event marketing and management;
   (b) allowing a user in communication with the website to create a plurality of event pages describing an event and a registration page associated with the event utilizing the online tools, each of the plurality of event pages being targeted to one of a plurality of participant groups, each of the plurality of participant groups comprising one or more participants, the event pages including a link to the registration page;
   (c) forwarding a first event page of the plurality of event pages to a first participant of a first participant group to enable the first participant to establish a first communication with the registration page utilizing the link;
   (d) forwarding the registration page to the first participant to be completed and returned in response to the first communication;
   (e) forwarding a second event page of the plurality of event pages to a second participant of a second participant group to enable the second participant to establish a second communication with the registration page utilizing the link, the first event page being different from the second event page, the first participant group being different from the second participant group;
   (f) forwarding the registration page to the second participant to be completed and returned in response to the second communication;
   (g) receiving the registration page and in response thereto communicating confirmations to the first and second participants; and
   (h) communicating to the user the information received from the first and second participants.

2. A method as recited in claim 1, further comprising associating a fee with the event.

3. A method as recited in claim 2, wherein the fee for the event is requested from the first and second participants in response to receiving the registration page.

4. A method as recited in claim 1, further comprising querying the first and second participants for information associated with participant attendance to the event.

5. A method as recited in claim 1, wherein previously created event pages are utilized for creating at least one of new events and new registration pages.

6. A method as recited in claim 1, further comprising storing a contact file of the user.

7. A method as recited in claim 6, wherein the first and second participants are selected from the contact file.

8. A method as recited in claim 6, wherein the stored file is imported from another source.

9. A method as recited in claim 6, further comprising exporting the contact file.

10. A method as recited in claim 1, further comprising generating participant parameters, wherein the first and second participants are forwarded the event page according to the participant parameters.

11. A method as recited in claim 1, further comprising associating a promotion code with the event in accordance with instructions from the user.

12. A method as recited in claim 1, wherein a registration template is utilized to create the registration page.

13. A method as recited in claim 1, further comprising grouping a plurality of events under a single event.

14. A method as recited in claim 1, wherein the event has a maximum participant capacity associated therewith.

15. A method as recited in claim 14, further comprising presenting the first and second participants with the option of being waitlisted where maximum capacity has been reached.

16. A method as recited in claim 14, wherein the user receives a notification when a predetermined percentage of maximum participant capacity is reached.

17. A method as recited in claim 16, wherein the user is allowed to modify the maximum participant capacity in response to the notification.

18. A method as recited in claim 1, wherein the confirmation includes a ticket for admission to the event.

19. A method as recited in claim 1, further comprising generating a report about the event for at least one of the user and the first and second participants.

20. A method as recited in claim 19, wherein the report includes information pertaining to at least one of budget, expenses, revenues, travel, accommodations, participant information, event details, attendance details, sub-organization, cross-events, profiling, scheduling, registration, change between data conveyed on specified dates, and change between data conveyed at specified times.

21. A method as recited in claim 19, wherein the report is generated according to at least one of a schedule.

22. A method as recited in claim 19, wherein the report includes at least one of an ad hoc report and a canned report.

23. A method as recited in claim 1, further comprising providing the user with data for tracking at least one of budget, expenses, and revenue.

24. A method as recited in claim 1, further comprising grouping one or more events into event categories.

25. A method as recited in claim 1, further comprising providing to the first and second participants at least one of accommodation information and travel information.

26. A method as recited in claim 1, further comprising organizing participants into the plurality of participant groups.

27. A method as recited in claim 1, further comprising assigning a first type to the first participant and a second type to the second participant.

28. A method as recited in claim 1, further comprising providing at least one of specified travel and accommodations according to participant type.

29. A method as recited in claim 1, further comprising assigning a first login to the first participant and a second login to the second participant.

30. A method as recited in claim 1, further comprising forwarding a survey to the first and second participants.

31. A method as recited in claim 1, further comprising receiving information related to a guest of the first or second participant on the registration page.

32. A method as recited in claim 1, wherein travel can be arranged utilizing an online booking system.

33. A system for providing enterprise event marketing and management automation comprising:
- a computer processor for executing a computer program; and
- a computer-readable storage medium for storing an executable computer program, the computer program comprising:
    - (a) means for allowing a user in communication with the website to create a plurality of event pages describing an event and a registration page associated with the event, each of the plurality of event pages being targeted to one of a plurality of participant groups, each of the plurality of participant groups comprising one or more participants, the event pages including a link to the registration page;
    - (b) means for forwarding a first event page of the plurality of event pages to a first participant of a first participant group to enable the first participant to establish a first communication with the registration page utilizing the link;
    - (c) means for forwarding the registration page to the first participant to be completed and returned in response to the first communication;
    - (d) means for forwarding a second event page of the plurality of event pages to a second participant of a second participant group to enable the second participant to establish a second communication with the registration page utilizing the link, the first event page being different from the second event page, the first participant group being different from the second participant group;
    - (e) means for forwarding the registration page to the second participant to be completed and returned in response to the second communication;
    - (f) means for receiving the registration page and in response thereto communicating confirmations to the first and second participants; and
    - (g) means for communicating to the user the information received from the first and second participants.

34. A system as recited in claim 33, further comprising means for associating a fee with the event.

35. A system as recited in claim 34, wherein the fee for the event is requested from the first and second participants in response to receiving the registration page.

36. A system as recited in claim 33, further comprising means for querying the first and second participants for information associated with participant attendance to the event.

37. A system as recited in claim 33, wherein previously created event pages are utilized for creating at least one of new events and new registration pages.

38. A system as recited in claim 33, further comprising means for storing a contact file of the user.

39. A system as recited in claim 38, wherein the first and second participants are selected from the contact file.

40. A system as recited in claim 33, further comprising means for generating participant parameters, wherein the first and second participants are forwarded the event page according to the participant parameters.

41. A system as recited in claim 33, further comprising means for associating a promotion code with the event in accordance with instructions from the user.

42. A system as recited in claim 33, wherein a registration template is utilized to create the registration page.

43. A system as recited in claim 33, further comprising means for generating a report about the event for at least one of the user and the first and second participants.

44. A system as recited in claim 33, wherein the event has a maximum participant capacity associated therewith.

45. A system as recited in claim 44, further comprising means for presenting the first and second participants with the option of being waitlisted where maximum capacity has been reached.

46. A system as recited in claim 44, wherein the user receives a notification when a predetermined percentage of maximum participant capacity is reached.

47. A system as recited in claim 46, wherein the user is allowed to modify the maximum participant capacity in response to the notification.

48. A system as recited in claim 33, wherein the confirmation includes a ticket for admission to the event.

49. A computer program embodied on a computer readable storage medium for providing enterprise event marketing and management automation comprising:
- (a) a code segment that provides a website including online tools for event marketing and management;
- (b) a code segment that allows a user in communication with the website to create a plurality of event pages describing an event and a registration page associated with the event utilizing the online tools, each of the plurality of event pages being targeted to one of a plurality of participant groups, each of the plurality of participant groups comprising one or more participants, the event pages including a link to the registration page;
- (c) a code segment that forwards a first event page of the plurality of event pages to a first participant of a first participant group to enable the first participant to establish a first communication with the registration page utilizing the link;
- (d) a code segment that forwards the registration page to the first participant to be completed and returned in response to the first communication;
- (e) a code segment that forwards a second event page of the plurality of event pages to a second participant of a second participant group to enable the second participant to establish a second communication with the registration page utilizing the link, the first event page being different from the second event page, the first participant group being different from the second participant group;
- (f) a code segment that forwards the registration page to the second participant to be completed and returned in response to the second communication;
- (g) a code segment that receives the registration page and in response thereto communicates confirmations to the first and second participants; and
- (h) a code segment that communicates to the user the information received from the first and second participants.

50. A computer program as recited in claim 49, further comprising a code segment that associates a fee with the event.

51. A computer program as recited in claim 50, wherein the fee for the event is requested from the first and second participants in response to receiving the registration page.

52. A computer program as recited in claim 49, further comprising a code segment that queries the first and second participants for information associated with participant attendance to the event.

53. A computer program as recited in claim 49, wherein previously created event pages are utilized for creating at least one of new events and new registration pages.

54. A computer program as recited in claim 49, further comprising a code segment that stores a contact file of the user.

55. A computer program as recited in claim 54, wherein the first and second participants are selected from the contact file.

56. A computer program as recited in claim 49, further comprising a code segment that generates participant parameters, wherein the first and second participants are forwarded the event page according to the participant parameters.

57. A computer program as recited in claim 49, further comprising a code segment that associates a promotion code with the event in accordance with instructions from the user.

58. A computer program as recited in claim 49, wherein a registration template is utilized to create the registration page.

59. A computer program as recited in claim 49, further comprising a code segment that generates a report about the event for at least one of the user and the first and second participants.

60. A computer program as recited in claim 49, wherein the event has a maximum participant capacity associated therewith.

61. A computer program as recited in claim 60, further comprising a code segment that presents the first and second participants with the option of being waitlisted where maximum capacity has been reached.

62. A computer program as recited in claim 60, wherein the user receives a notification when a predetermined percentage of maximum participant capacity is reached.

63. A computer program as recited in claim 62, wherein the user is allowed to modify the maximum participant capacity in response to the notification.

64. A computer program as recited in claim 49, wherein the confirmation includes a ticket for admission to the event.

\* \* \* \* \*